US008780185B2

(12) United States Patent
Kasai et al.

(10) Patent No.: US 8,780,185 B2
(45) Date of Patent: Jul. 15, 2014

(54) IMAGE PICKUP APPARATUS HAVING A DISPLAY CONTROLLED USING INTERCHANGEABLE LENS INFORMATION AND/OR FINDER INFORMATION

(75) Inventors: Tsubasa Kasai, Tokyo (JP); Hiroshi Kodama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 552 days.

(21) Appl. No.: 12/953,199

(22) Filed: Nov. 23, 2010

(65) Prior Publication Data

US 2011/0122233 A1 May 26, 2011

(30) Foreign Application Priority Data

Nov. 25, 2009 (JP) .................................. 2009-268135
May 24, 2010 (JP) .................................. 2010-118781

(51) Int. Cl.
*H04N 13/02* (2006.01)
*H04N 13/00* (2006.01)
*H04N 5/222* (2006.01)

(52) U.S. Cl.
CPC ............... *H04N 13/02* (2013.10); *H04N 5/222* (2013.01); *H04N 13/00* (2013.01)
USPC ................... 348/49; 348/207.99; 348/333.01; 348/333.07; 348/42; 359/462

(58) Field of Classification Search
CPC ......... H04N 15/00; H04N 5/225; H04N 13/00
USPC ......................................................... 348/49
See application file for complete search history.

(56) References Cited

U.S. PATENT DOCUMENTS 4,580,887 A * 4/1986 Goto .............................. 396/373
5,862,419 A * 1/1999 Goto et al. .................... 396/121
(Continued)

FOREIGN PATENT DOCUMENTS

JP 61-296335 12/1986
JP 05-210142 8/1993
(Continued)

OTHER PUBLICATIONS

Office Action from Japanese Patent Application No. 2009-268135, mailed Oct. 29, 2013 (4 pgs.).
(Continued)

*Primary Examiner* — Jay Patel
*Assistant Examiner* — Jessica Prince
(74) *Attorney, Agent, or Firm* — John C. Pokotylo; Straub & Pokotylo

(57) ABSTRACT

An image pickup apparatus includes: an image pickup unit; a first connection unit that allows a stereoscopic shooting interchangeable lens and an ordinary shooting interchangeable lens to be selectively attached thereto so that an image of a subject can be formed on the image pickup unit; a second connection unit that allows a finder including two display units corresponding to a right eye and a left eye, the finder being capable of displaying a plurality of images, and a finder including a single display unit, the finder being capable of displaying a single image, to be selectively attached thereto; and a display control unit that controls display of an image picked up by the image pickup unit on the finder, based on at least one of information on the interchangeable lens connected to the first connection unit and information on the finder connected to the second connection unit.

10 Claims, 26 Drawing Sheets

(56) References Cited

U.S. PATENT DOCUMENTS

| | | | |
|---|---|---|---|
| 6,278,480 B1* | 8/2001 | Kurahashi et al. | 348/59 |
| 6,864,911 B1* | 3/2005 | Zhang et al. | 348/42 |
| 2004/0150728 A1* | 8/2004 | Ogino | 348/239 |
| 2005/0057806 A1 | 3/2005 | Nozawa et al. | |
| 2008/0231741 A1* | 9/2008 | McIntyre et al. | 348/333.01 |
| 2012/0069236 A1* | 3/2012 | Namba et al. | 348/335 |
| 2013/0113983 A1* | 5/2013 | Yumiki | 348/345 |

FOREIGN PATENT DOCUMENTS

| | | |
|---|---|---|
| JP | 2001-103512 | 4/2001 |
| JP | 2002-027496 | 1/2002 |
| JP | 2002-077945 | 3/2002 |
| JP | 2004-004869 | 1/2004 |
| JP | 2004-129186 | 4/2004 |
| JP | 2005-115251 | 4/2005 |
| JP | 2005-130310 | 5/2005 |
| JP | 2006-165601 | 6/2006 |
| JP | 2009-290863 | 12/2009 |

OTHER PUBLICATIONS

Office Action from corresponding Japanese Patent Application No. 2010-118781, mailed Feb. 25, 2014 (3 pgs.).

\* cited by examiner

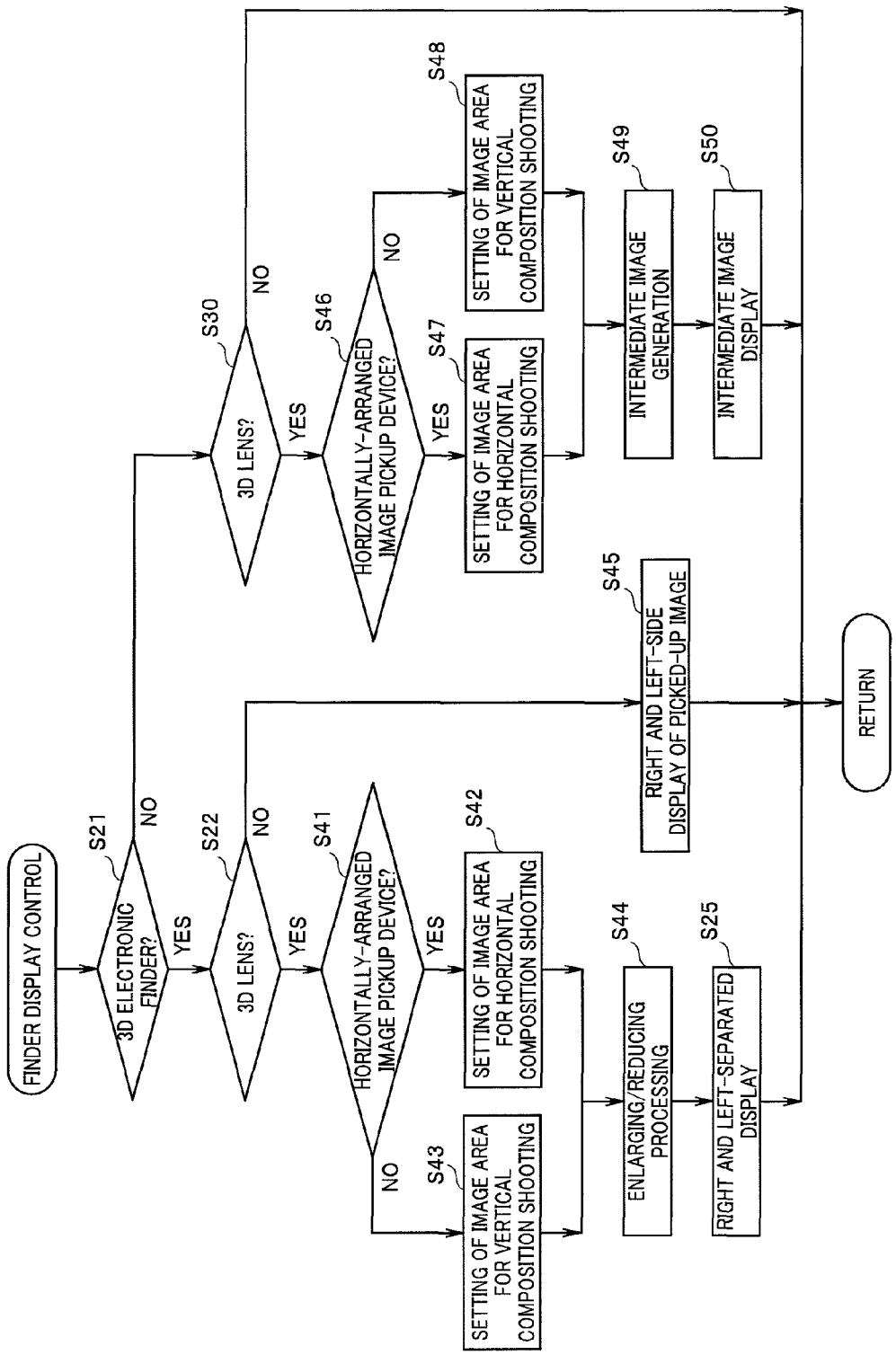

IMAGE PICKUP APPARATUS HAVING A DISPLAY CONTROLLED USING INTERCHANGEABLE LENS INFORMATION AND/OR FINDER INFORMATION

CROSS REFERENCE TO RELATED APPLICATION

This application claims benefit of Japanese Applications No. 2009-268135 filed in Japan on Nov. 25, 2009 and No. 2010-118781 filed in Japan on May 24, 2010, the contents of which are incorporated by this reference.

BACKGROUND OF THE INVENTION

1. Field of the Invention

The present invention relates to an image pickup apparatus enabling shooting and display of two dimensional and three dimensional images.

2. Description of the Related Art

In recent years, portable apparatuses equipped with a shooting function, such as a digital camera, have overcome the problem of shooting various types of scenes, which such portable apparatuses have been weak at, using image processing. Also, in recent years, in the film industry, there has been a trend of introduction of 3D (three-dimensional) effect making much of realistic sensation, and following the trend, the television industry has the tendency of 3D-display apparatuses becoming popular.

Among the consumer image shooting apparatuses such as digital cameras, apparatuses enabling 3D shooting have been developed. There are a wide variety of proposals for a method for shooting and recording an image with stereoscopic information included and reproducing and viewing such image. For example, Japanese Patent Application Laid-Open Publication No. 2006-165601 discloses a technique in which incoming light from a lens is divided into a plurality of light beams and then the light beams are made to be incident on a plurality of image pickup devices having different incidence directional characteristics, thereby generating images with parallax.

Also, for example, Japanese Patent No. 4225768 discloses an apparatus including correction means for correcting an error (inclination) and/or positional misalignment in the vertical direction between horizontally-arranged images for both eyes according to the display means.

Although there are various kinds of factors for a human to have a stereoscopic sensation, in general, it has been said that a human has a stereoscopic sensation based on information such as binocular parallax, motion parallax, binocular vergence, focus and relative size. From among these pieces of information, binocular parallax, which is the largest factor for getting a stereoscopic sensation, is often used in a method for artificially providing a stereoscopic image.

As described above, for enabling provision of a stereoscopic vision, it is necessary to pick up a right-eye image and a left-eye image, that is, at least two image having parallax according to the viewpoints of both left and right eyes. The right-eye image and left-eye image are images having displacements from each other according to the parallax. Thus, unless camera shooting is performed while viewing 3D display, a desired view angle is not necessarily obtained.

Furthermore, there is a difference between stereoscopic sensation a human has with his/her bare eyes and stereoscopic sensation provided by a shot image due to various causes such as the distance between the right-eye and left-eye lenses and the distance to the subject. Accordingly, in order for a user to perform shooting so as to achieve desired stereoscopic effect, it is necessary to perform the camera shooting while viewing 3D display.

Also, in 3D shooting, two image pickup apparatuses, that is, an image pickup apparatus for picking up a right image and an image pickup apparatus for picking up a left image. Furthermore, an image pickup apparatus that obtains a 3D image by means of such one image pickup apparatus has been developed. The image pickup apparatus is provided with one image pickup device to form optical images from two image pickup lenses, that is, right-eye and left-eye pickup lenses, on the image pickup plane of such one image pickup device.

In such image pickup apparatus, in order to enhance the quality of 3D display, it is important to display two 3D images aligned with each other. In the apparatus disclosed in Japanese Patent Application Laid-Open Publication No. 2006-165601, correction is performed according to the displacement between the left and right images.

SUMMARY OF THE INVENTION

An image pickup apparatus according to an aspect of the present invention includes: an image pickup unit; a first connection unit that allows a stereoscopic shooting interchangeable lens and an ordinary shooting interchangeable lens to be selectively attached to the first connection unit so that an image of a subject can be formed on the image pickup unit; a second connection unit that allows a finder including two display units corresponding to a right eye and a left eye, the finder being capable of displaying a plurality of images, and a finder including a single display unit, the finder being capable of displaying a single image, to be selectively attached to the second connection unit; and a display control unit that controls display of an image picked up by the image pickup unit on the finder, based on at least one of information on the interchangeable lens connected to the first connection unit and information on the finder connected to the second connection unit.

An image pickup apparatus according to another aspect of the present invention including an image pickup unit, the image pickup apparatus allowing a stereoscopic shooting interchangeable lens to be connected thereto so that an image of a subject can be formed on the image pickup unit, includes: a communication unit that obtains correction factor data for correcting a reproducibility defect in the image of the subject formed on the image pickup unit, the defect being caused by the interchangeable lens based on a state of a lens system in the interchangeable lens; and an image correcting unit that generates an image in which a displacement of the image of the subject has been corrected based on the correction factor data obtained by the communication unit.

An stereoscopic shooting interchangeable lens apparatus according to an aspect of the present invention includes: a joint unit that allows the stereoscopic shooting interchangeable lens apparatus to be attached/detached to/from a lens mount of a camera main body including an image pickup device; a stereoscopic image pickup optical system including a plurality of light ray incident surfaces, the stereoscopic image pickup optical system forming a plurality of parallax images having parallax according to positions of the plurality of light ray incident surfaces, on the image pickup device; a correction parameter storing unit that stores a correction parameter used for electrically correcting an image formed by the stereoscopic image pickup optical system; and a communication unit that when the joint unit is connected to the lens mount of the camera main body, transmits the correction parameter stored in the storing unit to the camera main body.

The above and other objects, features and advantages of the invention will become more clearly understood from the following description referring to the accompanying drawings.

BRIEF DESCRIPTION OF THE DRAWINGS

FIG. 13 is a flowchart illustrating a second embodiment of the present invention;

DETAILED DESCRIPTION OF THE PREFERRED EMBODIMENTS

Hereinafter, embodiments of the present invention will be described with reference to the drawings.
(First Embodiment)

Figure 1:
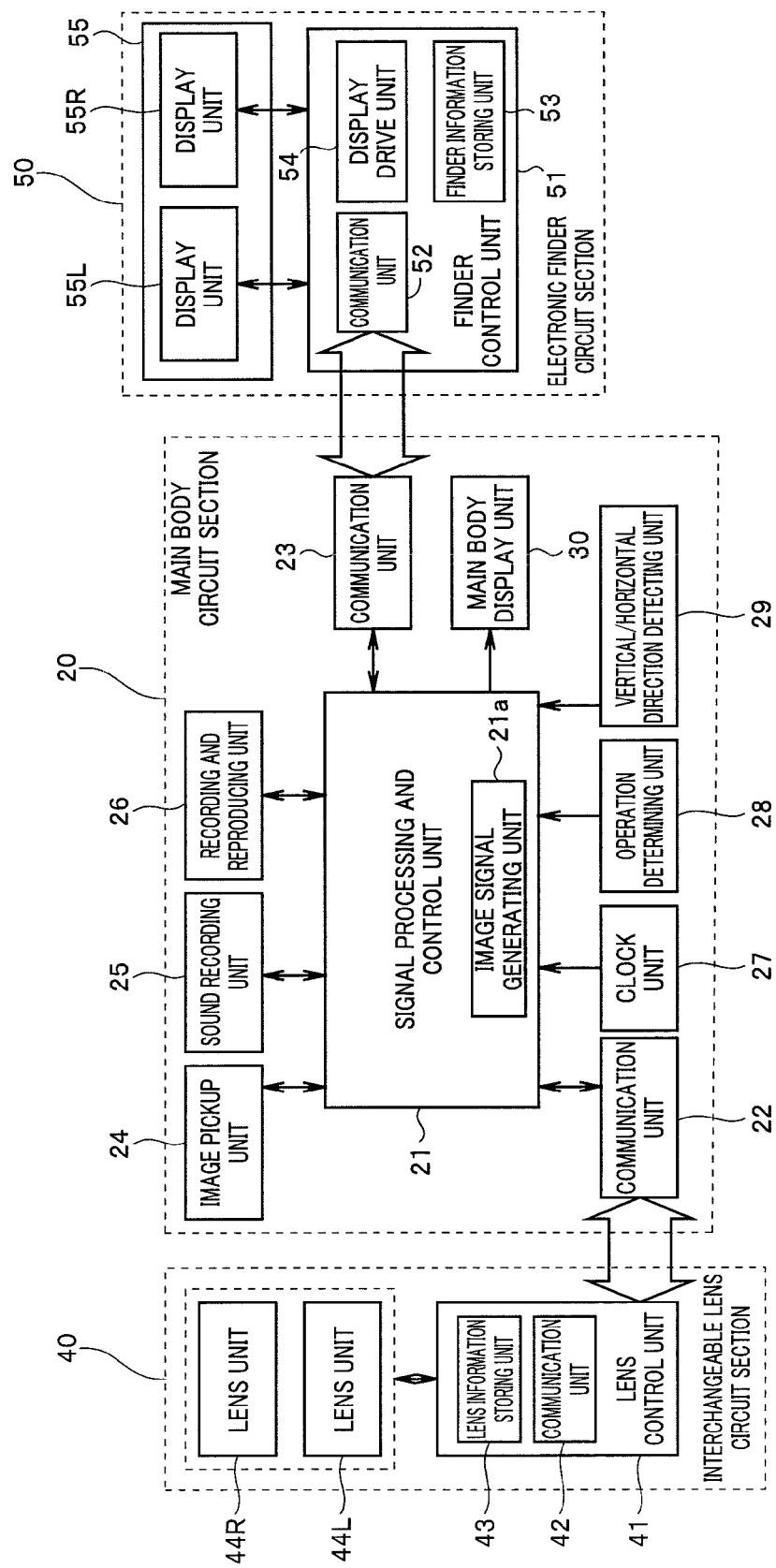
FIG. 1 is a block diagram illustrating a circuit configuration of an image pickup apparatus according to a first embodiment of the present invention.
Figure 2:
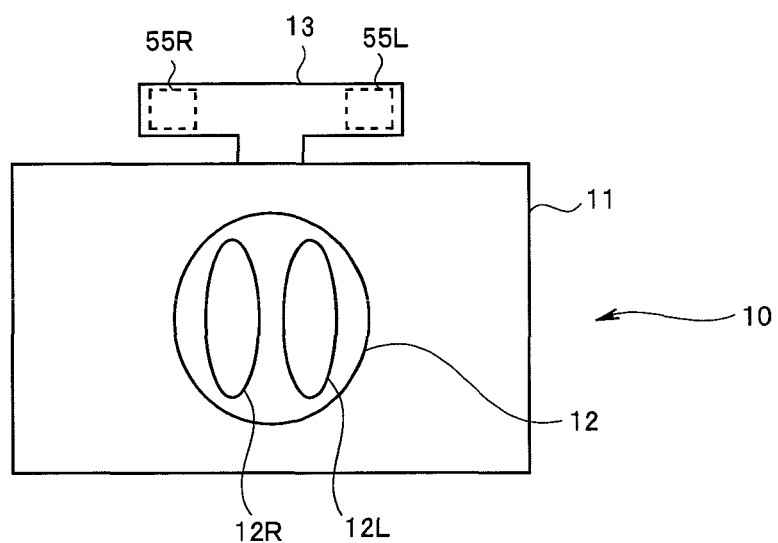
FIG. 2 is a diagram illustrating an appearance of an image pickup apparatus with an interchangeable lens and an electronic finder attached thereto.

FIG. 1 is a block diagram illustrating a circuit configuration of an image pickup apparatus according to a first embodiment of the present invention. FIG. 2 is a diagram illustrating an appearance of an image pickup apparatus with an interchangeable lens and an electronic finder attached thereto.

In FIG. 2, an image pickup apparatus 10 includes a lens mount (not illustrated) on a front surface of an image pickup apparatus main body 11, which allows an interchangeable lens 12 to be attached to the image pickup apparatus 10. Also, the image pickup apparatus main body 11 includes an accessory shoe (not illustrated) on a top side, which allows an electronic finder 13 to be attached to the image pickup apparatus main body 11.
(Circuit Configuration)

The image pickup apparatus main body 11 of the image pickup apparatus 10 includes a main body circuit section 20 inside. As illustrated in FIG. 1, the main body circuit section 20 is provided with communication units 22 and 23 Meanwhile, the interchangeable lens 12 employed in the present embodiment includes an interchangeable lens circuit section 40 inside, and the electronic finder 13 includes an electronic finder circuit section 50 inside. The interchangeable lens circuit section 40 and electronic finder circuit section 50 are provided with communication units 42 and 52, respectively. The communication units 22 and 23 in the main body circuit section 20 can transmit/receive information to/from the communication unit 42 in the interchangeable lens circuit section 40 and the communication unit 52 in the electronic finder circuit section 50, respectively.

In the present embodiment, for the interchangeable lens 12, both one for 3D shooting including two image pickup lenses 12R and 12L (see FIG. 2) enabling pickup of a right-eye image and a left-eye image, and one for 2D shooting enabling 2D shooting via one image pickup lens can be employed.

A lens control unit 41 in the interchangeable lens circuit section 40 includes a lens information storing unit 43 that stores lens information. Here, the interchangeable lens circuit section 40 in FIG. 1 is an example of one for 3D shooting including lens units 44R and 44L including image pickup lenses 12R and 12L, respectively. Examples of the lens information include information on the number of lens units and information on an optical system. The lens control unit 41 is configured so as to drive the lens units 44R and 44L to control, e.g., the diaphragm, focus and zooming, etc., of the image pickup lenses 12R and 12L, respectively, under control of the main body circuit section 20. The lens control unit 41 may also be configured so as to change variables specific to 3D shooting such as a baseline length and a vengeance angle.

The communication unit 42 in the lens control unit 41 transmits/receives information to/from the communication unit 22 in the main body circuit section 20 via a predetermined transmission channel. When communication between the lens control unit 41 and the communication unit 22 in the main body circuit section 20 has been established, the lens control unit 41 can transmit lens information read from the lens information storing unit 43 to the main body circuit section 20 via the communication unit 42. Consequently, the main body circuit section 20 can recognize that the interchangeable lens 12 includes two image pickup lenses 12R and 12L and on which areas of an image pickup plane of an image pickup device, which will be described later, respective optical images of a subject from the image pickup lenses 12R and 12L are formed.

Meanwhile, in the present embodiment, for the electronic finder 13, a 3D display finder capable of displaying a right-eye image and a left-eye image via a display device 55 including display units 55R and 55L, respectively, can be employed. Furthermore, for the electronic finder, various types of finders such as a 2D display finder including only one display unit. In FIG. 1, an example of a 3D display finder is illustrated. As illustrated in FIG. 2, the display units 55R and 55L in the 3D display electronic finder are provided with a space, which corresponds to, for example, a space between the eyes of a human, therebetween. The display units 55R and 55L can include organic ELs or LCDs. The 3D display electronic finder includes a mechanism that changes the space between the display units, which corresponds to a space between both eyes, enabling a user to make a fine adjustment.

A finder control unit 51 in the electronic finder circuit section 50 is provided with a finder information storing unit 53. The finder information storing unit 53 holds finder information relating to the display device 55 in the electronic finder 13. The finder information indicates whether the display device 55 includes one display unit or two display units.

The communication unit 52 in the finder control unit 51 transmits/receives information to/from the communication unit 23 in the main body circuit section 20 via a predetermined transmission channel. When communication between the finder control unit 51 and the communication unit 23 in the main body circuit section 20 has been established, the finder control unit 51 can transmit the finder information stored in the finder information storing unit 53 to the main body circuit section 20 via the communication unit 52. Consequently, the main body circuit section 20 can recognize that the display device 55 includes two display units 55R and 55L.

When the finder control unit 51 has received image information from the main body circuit section 20, the finder control unit 51 generates image signals based on the image information by means of a display drive unit 54. Since the main body circuit section 20 has also outputted display control information regarding a manner of display in the display device 55, the display drive unit 54 provides the image signals to the display device 55 based on the display control information to make the display device 55 provide display the image signals.

For example, when the display drive unit 54 has received 3D display image information from the main body circuit section 20, the display drive unit 54 provides right-eye image signals to the display unit 55R and left-eye image signals to the display unit 55L based on the display control information. Consequently, a user can view a 3D image by looking into the display units 55R and 55L in the electronic finder 13 with his/her eyes. Here, because of settings such as the baseline length, the vengeance angle, the focal length and the space between the eyes in the finder unit, as well as individual variation, parallax adjustment for left and left images is necessary. A method for the adjustment will also be described later.

The main body circuit section 20 includes an image pickup unit 24 including an image pickup device such as a CCD or CMOS sensor. An optical image of a subject from the interchangeable lens 12 is formed on an image pickup plane of an image pickup device included in the image pickup unit 24.

The image pickup unit 24 is driven under control of a signal processing and control unit 21. The signal processing and control unit 21 holds information on the image pickup plane of the image pickup device included in the image pickup unit 24. The signal processing and control unit 21 outputs a drive signal for the image pickup device to the image pickup unit 24 based on the information on the image pickup plane and the lens information, and loads image signals that the image pickup device has obtained as a result of photoelectric conversion of an optical image. Also, the main body circuit section 20 is provided with a sound recording unit 25, which records sounds outside the image pickup apparatus 10 and outputs sound signals to the signal processing and control unit 21.

The signal processing and control unit 21 performs predetermined signal processing, for example, color signal generation processing, matrix conversion processing and other various types of digital processing, on the image signals obtained as a result of photoelectric conversion by the image pickup device. In recording, e.g., the image signals and the sound signals, the main body circuit section 20 can also perform coding processing on, e.g., the image signals and the sound signals to output, e.g., compressed image information and sound information.

A left and right image signal generating unit 21*a* in the signal processing and control unit 21 can set image areas according to the ranges of incoming light from the lens units 44R and 44L in the image pickup plane of the image pickup unit 24 based on the information on the image pickup plane and the lens information. For example, in a case where the lens information indicates that the interchangeable lens includes two lens units, the left and right image signal generating unit 21*a* divides the image pickup plane of the image pickup unit 24 into a right-eye image area and a left-eye image area according to the respective light entrance ranges of the incoming light from the respective lens units, and performs signal processing of image signals from the respective image areas as right-eye image signals and left-eye image signals.

The left and right image signal generating unit 21*a* may set image areas according to not only the information on the image pickup plane and the lens information, but also processing such as diaphragm and/or zooming processing or parallax adjustment between left and right images.

The main body circuit section 20 is also provided with a clock unit 27 and an operation determining unit 28. The clock unit 27 generates time information, which is used by the signal processing and control unit 21. The operation determining unit 28 generates an operation signal based on a user's operation of a release switch or various types of switches for, e.g., shooting mode setting (not illustrated) provided to the image pickup apparatus 10 and outputs the signal to the signal processing and control unit 21. The signal processing and control unit 21 controls the respective units based on operation signals.

Also, the main body circuit section 20 is provided with a recording and reproducing unit 26 and a main body display unit 30. The recording and reproducing unit 26 can record image information and sound information from the signal processing and control unit 21 to a recording medium (not illustrated). For the recording and reproducing unit 26, for example, a card interface may be employed, and the recording and reproducing unit 26 can record, e.g., image information and sound information into, e.g., a memory card. Also, the recording and reproducing unit 26 can read image information and sound information recorded in the recording medium and supplies the image information and sound information to the signal processing and control unit 21. The signal processing and control unit 21 decodes the image information and sound information from the recording and reproducing unit 26 to obtain image signals and sound signals.

The main body display unit 30 can be supplied with a picked-up image from the image pickup unit 24 or a reproduced image from the recording and reproducing unit 26, from the signal processing and control unit 21, and provide display of such image. Also, the main body display unit 30 can provide, e.g., a menu display for operating the image pickup apparatus 10, under control of the signal processing and control unit 21. The main body display unit 30 may include a touch panel.

Furthermore, in the present embodiment, the main body circuit section 20 is provided with a vertical/horizontal direction detecting unit 29. The vertical/horizontal direction detecting unit 29 detects the direction of the image pickup apparatus main body 11, and outputs vertical/horizontal direction detection information, which is the result of the detection, to the signal processing and control unit 21.

The signal processing and control unit 21 can control the interchangeable lens 12 and the electronic finder 13 via the communication units 22 and 23 as well as controlling the respective units in the main body circuit section 20. The signal processing and control unit 21 generates display control information based on the lens information from the interchangeable lens 12, the finder information from the electronic finder 13 and the vertical/horizontal direction detection information to provide optimum finder display.

FIGS. 3A and 3B and FIG. 4A to 4C are diagram illustrating the relationships between an interchangeable lens 12 and an electronic finder 13, and compositions.

Figure 3A:
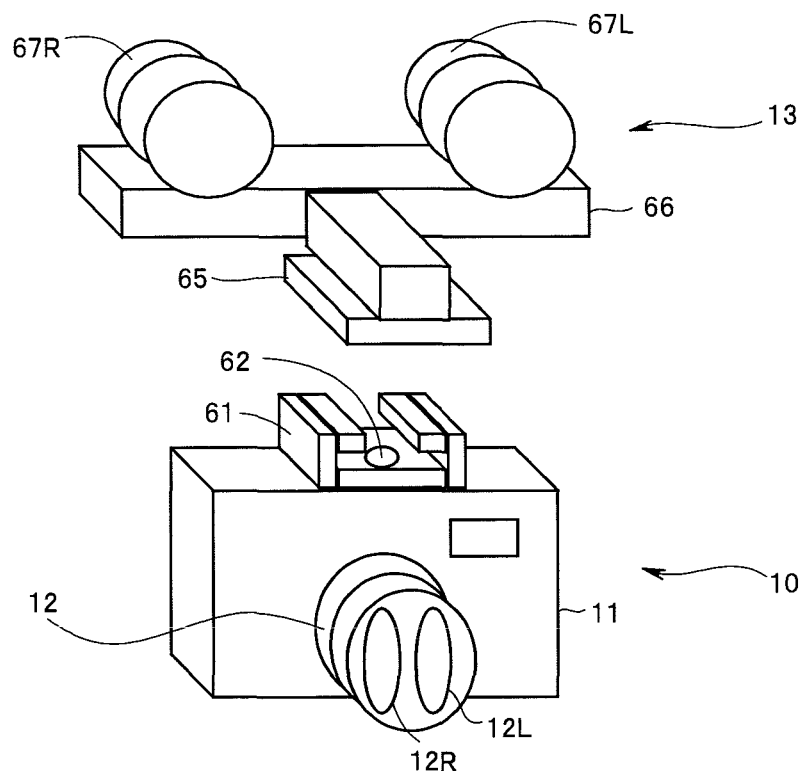
FIGS. 3A and 3B are diagrams illustrating a relationship between an interchangeable lens 12 and an electronic finder 13, and compositions.

FIG. 3A illustrates an image pickup apparatus 10, an interchangeable lens 12 and an electronic finder 13 corresponding to those in FIGS. 1 and 2. The interchangeable lens 12 is attached to a lens mount (not illustrated) on a front surface of an image pickup apparatus main body 11. The interchangeable lens 12 is a 3D shooting interchangeable lens including two image pickup lens units 12R and 12L. An accessory shoe 61 is provided on a top side of the image pickup apparatus main body 11. The electronic finder 13 includes an attachment unit 65 to be detachably attached to the accessory shoe 61. A holding unit 66 holding two display units 55R and 55L is rotatably attached to the attachment unit 65.

The accessory shoe 61 includes a contact unit 62, which is included in the communication unit 23 of the main body circuit section 20, and as a result of the attachment unit 65 of the electronic finder 13 being attached to the accessory shoe 61, the contact unit 62 is electrically connected to a contact unit (not illustrated) included in the attachment unit 65. The contact unit 62 in the attachment unit 65 is included in the communication unit 52 in the electronic finder circuit section 50.

The electronic finder 13 can transmit information indicating the rotational position of the holding unit 66 relative to the attachment unit 65, that is, the angle of the line connecting the display units 55R and 55L relative to the image pickup apparatus main body 11, to the main body circuit section 20 via the communication unit 52.

Figure 4A:
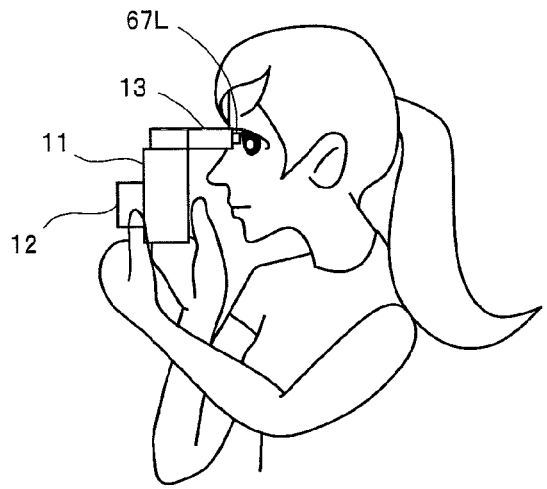
FIGS. 4A to 4C are diagrams illustrating a relationship between an interchangeable lens 12 and an electronic finder 13, and compositions.

FIG. 4A illustrates a state in which a user performs shooting with horizontally holding the image pickup apparatus main body 11, with the electronic finder 13 attached to the accessory shoe 61. In other words, FIG. 4A illustrates an example of horizontal composition shooting with the image pickup apparatus main body 11 horizontally held. In this case, as illustrated in FIG. 3A, the baseline connecting the image pickup lenses 12R and 12L is horizontal, enabling 3D shooting. The user performs shooting with her eyes facing eyepiece units 67R and 67L provided in the respective display units 55R and 55L.

In the example in FIGS. 3A and 4A, the vertical/horizontal direction detecting unit 29 in the main body circuit section 20 detects that the image pickup apparatus main body 11 is horizontally held. The signal processing and control unit 21 in the main body circuit section 20 recognizes from the lens information that the interchangeable lens 12 includes two lens units 44R and 44L. The left and right image signal generating unit 21a sets a right-eye image area and a left-eye image area in the image pickup plane of the image pickup device in the image pickup unit 24 based on the lens information.

The left and right image signal generating unit 21a generates a right-eye image and a left-eye image based on signals read from the respective image areas. The right-eye image and the left-eye image are provided with proper parallax based on the aforementioned parallax information, and supplied to the finder control unit 51 in the electronic finder 13. The finder control unit 51 provides the right-eye image to the display unit 55R, and the left-eye image to the display unit 55L. Consequently, the user can view 3D display based on optical images of a subject picked up by the image pickup lenses 12R and 12L by looking into the eyepiece units 67R and 67L of the electronic finder 13.

Figure 3B:
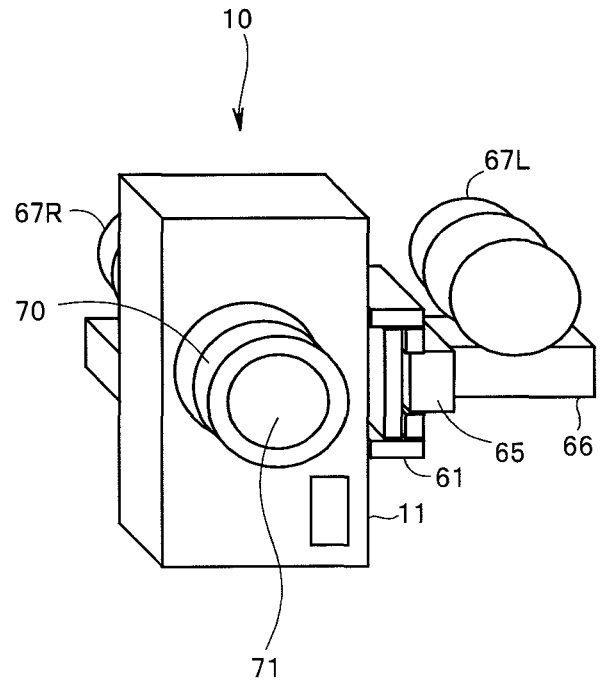

FIG. 3B illustrates an image pickup apparatus 10 and an electronic finder 13, and an interchangeable lens 70, which correspond to those in FIG. 1 and FIG. 2. The interchangeable lens 70 includes one lens unit including an image pickup lens 71. The interchangeable lens 70 is attached to a lens mount (not illustrated) on a front surface of an image pickup apparatus main body 11.

The interchangeable lens 70 includes an interchangeable lens circuit section similar to the interchangeable lens circuit section 40 in FIG. 1, and can transmit lens information to the main body circuit section 20. Also, in the interchangeable lens 70, e.g., a diaphragm, a focus and zooming of the image pickup lens 71 are controlled by the main body circuit section 20.

FIG. 3B illustrates a state in which a holding unit 66 is rotated by 90 degrees from the state illustrated in FIG. 3A relative to an attachment unit 65 so that the line connecting the display units 55R and 55L is horizontal.

Figure 4B:
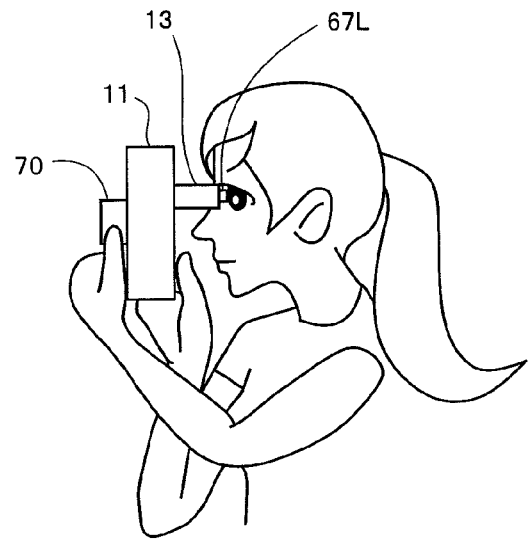

FIG. 4B illustrates a manner in which a user performs shooting holding the image pickup apparatus main body 11 in the state illustrated in FIG. 3B. In other words, FIG. 4B illustrates an example of vertical composition shooting with the image pickup apparatus main body 11 vertically held. In this case, 3D shooting cannot be performed, and thus, as illustrated in FIG. 3B, the interchangeable lens 70 including only one image pickup lens 71 is used.

In the vertical composition shooting, the line connecting the eyepiece units 67R and 67L provided in the respective display units 55R and 55L is also horizontal, and thus, the user can perform shooting with his/her eyes facing the eyepiece units 67R and 67L with his/her posture remaining erected.

In the example in FIGS. 3B and 4B, the vertical/horizontal direction detecting unit 29 in the main body circuit section 20 detects that the image pickup apparatus main body 11 is vertically held. The signal processing and control unit 21 in the main body circuit section 20 recognizes from lens information that the interchangeable lens 70 includes one image pickup lens 71. The left and right image signal generating unit 21a sets one image area in the image pickup plane of the image pickup device in the image pickup unit 24 based on the lens information, and generates image signals from the area. The image signals are supplied to the finder control unit 51 in the electronic finder 13. The finder control unit 51 provides the image signals to the display units 55R and 55L. Consequently, the user can view 2D display based on an optical image of a subject picked up by the image pickup lens 71 by looking into the eyepiece units 67R and 67L of the electronic finder 13 with his/her eyes.

Furthermore, the signal processing and control unit 21 can provide a reproduced 3D image or 2D image from the recording and reproducing unit 26 to the electronic finder 13, thereby providing 3D display or 2D display.

Figure 4C:
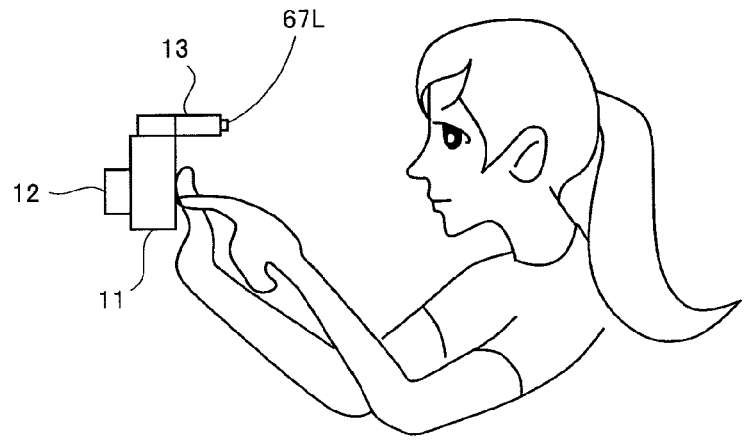

Also, the signal processing and control unit 21 can provide image signals obtained as result of images being picked up to a main body display unit 30, thereby providing display of the image signals. As illustrated in FIG. 4C, during, e.g., motion image shooting, a user can perform shooting while viewing an picked-up image via the main body display unit 30 provided on, for example, a back surface of the image pickup apparatus main body 11 as well. Furthermore, an arrangement may be made so that a parallax adjustment can be made by touching a touch panel provided on a back surface panel. Consequently, the apparatus becomes easier to use because if the adjustment result is reflected in the finder display results in the FIGS. 4A and 4B, the user could not touch images in the finder. For example, a parallax adjustment may be made so that parallax of a touched subject is eliminated. Here, left and right images are overlapped in a part corresponding to the touched position.

(Optical System)

Figure 5:
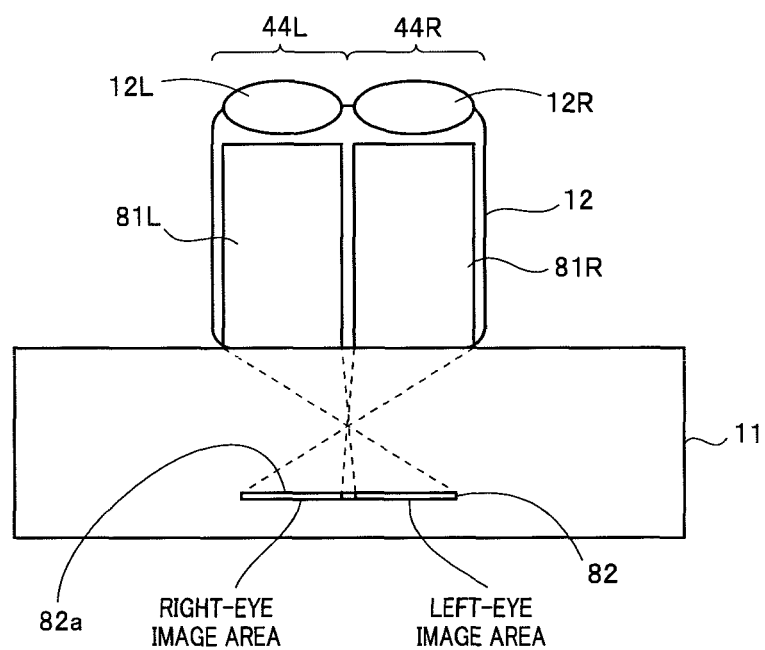
FIG. 5 is a diagram illustrating an example of optical systems employed in an interchangeable lens 12.
Figure 6A:
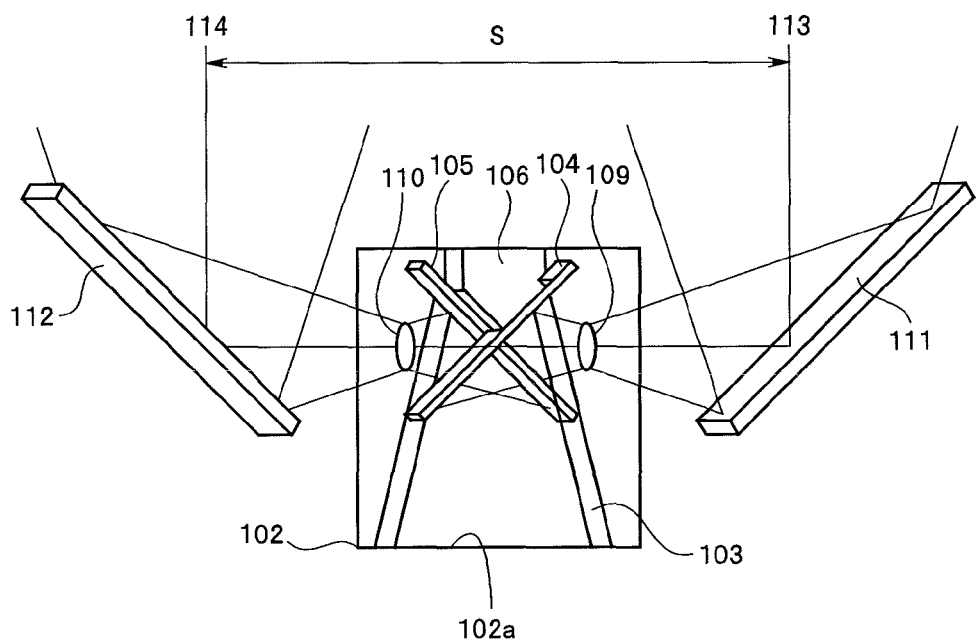
FIGS. 6A and 6B are diagrams illustrating an example of an optical system employed in an interchangeable lens 12.
Figure 6B:
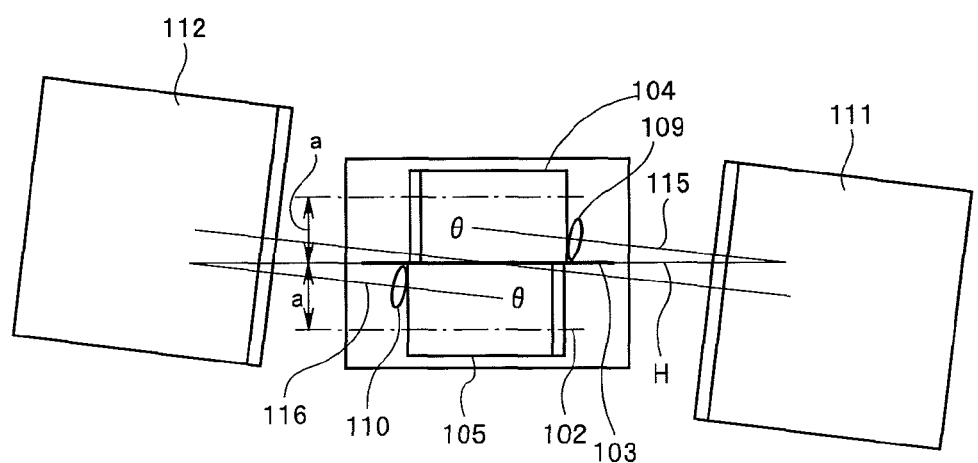
Figure 7A:
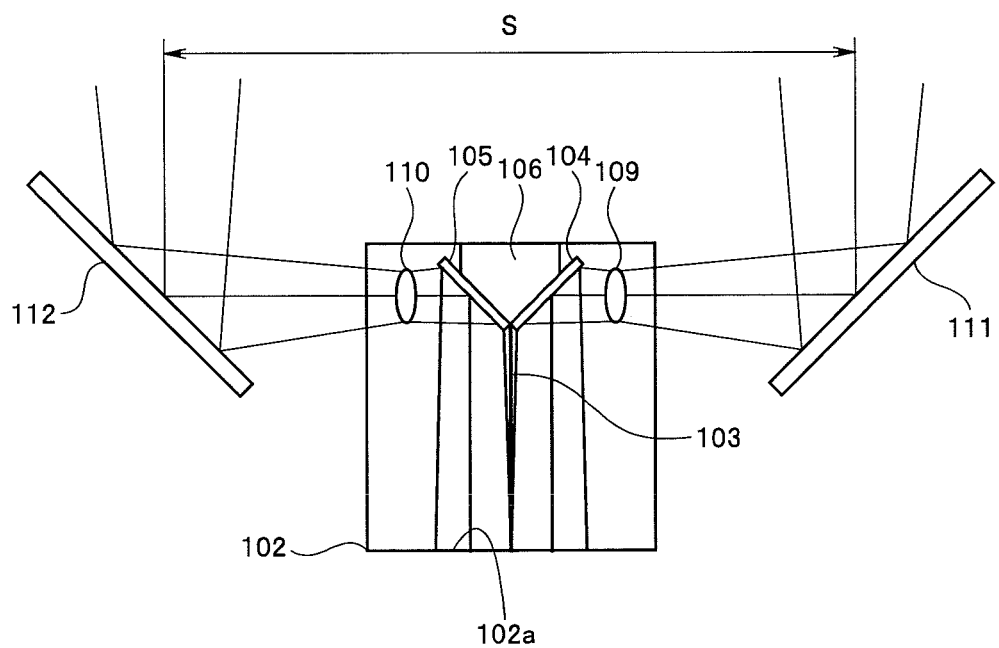
FIGS. 7A and 7B are diagrams illustrating an example of an optical system employed in an interchangeable lens 12.
Figure 7B:
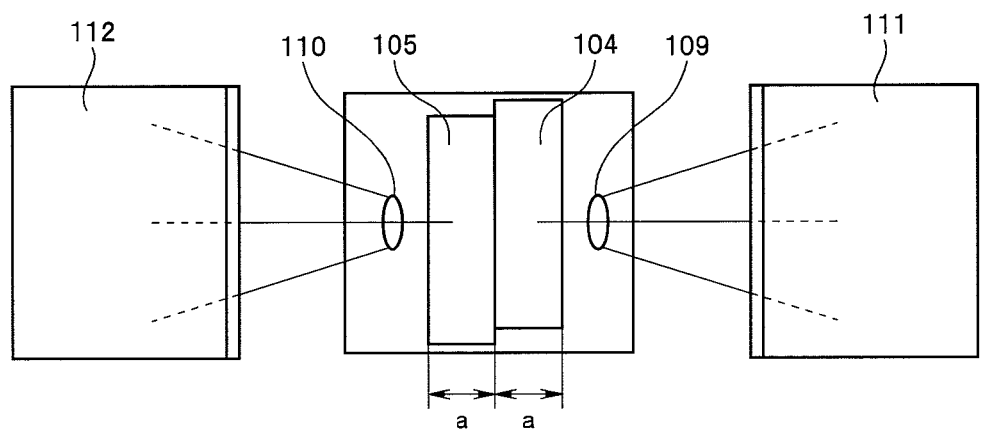

FIGS. 5 to 7B are diagrams illustrating examples of optical systems employed in the interchangeable lens 12. The example in FIGS. 6A and 6B and the example in FIGS. 7A and 7B are optical systems disclosed in Japanese Patent Application Laid-Open Publication Nos. 8-171151 and 2004-004869.

FIG. 5 illustrates the positional relationship between optical systems and an image pickup device of the image pickup apparatus 10 viewed from the upper side. FIG. 5 illustrates an example in which the interchangeable lens 12 employs a right-eye optical system 81R and a left-eye optical system 81L as optical systems included in the lens units 44R and 44L, respectively. The image pickup apparatus main body 11 includes an image pickup plane 82a of an image pickup device 82 included in the image pickup unit 24, which faces the optical systems 81R and 81L.

A left-eye image area is set on the right side in the horizontal direction of the image pickup plane 82a of the image pickup device 82 and a right-eye image area is set on the left side in the horizontal direction of the image pickup plane 82a. Light incident on the image pickup lens 12R forms an image on the right-eye image area provided on the left side in the horizontal direction of the image pickup plane 82a via the right-eye optical system 81R. Also, light incident on the image pickup lens 12L forms an image on the left-eye image area provided on the right side in the horizontal direction of the image pickup plane 82a via the left-eye optical system 81L.

FIGS. 6A and 6B, and FIGS. 7A and 7B illustrate other optical system examples. The examples in FIGS. 6A and 6B, and FIGS. 7A and 7B indicate optical systems in the case of picking up a horizontal 3D image FIGS. 6A and 7A each illustrate a plan view of the respective optical systems and FIGS. 6B and 7B illustrate a bottom view of the optical systems in FIGS. 6A and 7A, respectively. The examples in FIGS. 6A and 6B and FIG. 7A and FIG. 7B will be described supposing that an image pickup device 102 is employed for the image pickup device in the image pickup unit 24 included in the image pickup apparatus main body 11.

In FIGS. 6A and 6B, reflecting mirrors 104 and 105 are rotatably attached to a holder 106 fixed to the image pickup apparatus main body 11. Respective reflecting surfaces of the reflecting mirrors 104 and 105 can rotate on a same plane. A fixed space is provided between the reflecting mirror 104 and the reflecting mirror 105, and respective distal ends of partition walls 103 are inserted into the space. Accordingly, when the partition walls 103 are rotated, the reflecting mirrors 104 and 105 are thereby rotated.

A reflecting mirror 111 and the reflecting mirror 104, which forms one reflective optical system, are optically sequentially arranged from the light entrance side so that light from a subject (a right-side subject image) enters the reflecting mirror 111 and then is reflected by the reflecting surface of the reflecting mirror 111, and next, the light enters the reflecting mirror 104 and then is reflected by the reflecting surface of the reflecting mirror 104 and forms an image on the upper side of the image pickup plane 102a. Here, it is preferable that the reflecting surface of the reflecting mirror 104 and the reflecting surface of the reflecting mirror 111 are substantially parallel to each other to the degree that the reflecting surfaces can form an image on the image pickup plane 102a. Also, a reflecting mirror 112 and the reflecting mirror 105, which forms another reflective optical system, as in the reflecting mirror 111 and the reflecting mirror 104, are optically sequentially arranged from the light entrance side so that light from a subject (a left-side subject image) forms an image on the lower side of the image pickup plane 102a.

A convex lens 109 is provided between the reflecting mirror 111 and the reflecting mirror 104, for forming a subject image from the right side on the upper side of the image pickup plane 102a via the reflecting mirror 104. Accordingly, the convex lens 109 is arranged along the optical axis of light emitted from the reflecting mirror 111. Also, a convex lens 110, as in the convex lens 109, is provided between the reflecting mirror 112 and the reflecting mirror 105. Although reflecting mirrors are used in the reflective optical systems, prisms or other reflective optical elements may be used instead of the reflecting mirrors. Also, although each of the convex lenses 109 and 110 is illustrated as a single lens, it should be understood that each such convex lens can be formed by a plurality of lenses. Furthermore, the reflecting mirror 111 and the convex lens 109 can also be replaced with a prism including a convex surface having both of the effects of the reflecting mirror 111 and the convex lens 109.

Also, for a space S between left and right optical axes 113 and 114 on the light entrance side illustrated in FIG. 6A, a predetermined value is selected with reference to human interpupillary distance, taking the size of a subject, the distance from the subject into consideration. In order to form an object on each of the optical axes 113 and 114 on the center of the image pickup plane 102a, as illustrated in FIG. 6B, optical axes 115 and 116 passing through the convex lenses 109 and 110 are inclined by a predetermined angle θ relative to a horizontal line H. The angle θ can be calculated by an equation of $\tan \theta = a/S$. As described above, the convex lenses 109 and 110 is provided between two reflecting mirrors 104 and 111, and 105 and 112, respectively, enabling an image of a subject at a horizontally wider angle of view to be formed on the image pickup plane 102a.

In the optical system with the above-described configuration, light beams of subject images having parallax are incident on the respective reflective optical systems provided on the left and right sides, and reflected by the two reflecting surfaces in the respective reflective optical systems. One of the light beams exposes the right-eye image area, which is the upper half of the image pickup plane 102a divided by the partition wall 103 and the other light beam exposes the left-eye image area, which is the lower half.

Signals from the right-eye image area are extracted as right-eye image signals, and signals from the left-eye image area are extracted as left-eye image signals, and then the result of parallax adjustment (determination of the left and right image overlapping position and stereoscopic effect adjustment according to the determination) is reflected in the image signals, enabling provision of a 3D image.

In the above configuration, a 3D image with another size can also be provided by rotating the reflecting mirrors 104 and 105. In other words, FIGS. 7A and 7B illustrate a state in which the reflecting mirrors 104 and 105 are rotated by 90 degrees from the state in FIGS. 6A and 6B. In this case, it should be understood that the positions of the convex lens are moved in conjunction with the rotation of the reflecting mirrors 111 and 112.

(Operation)

Figure 8:
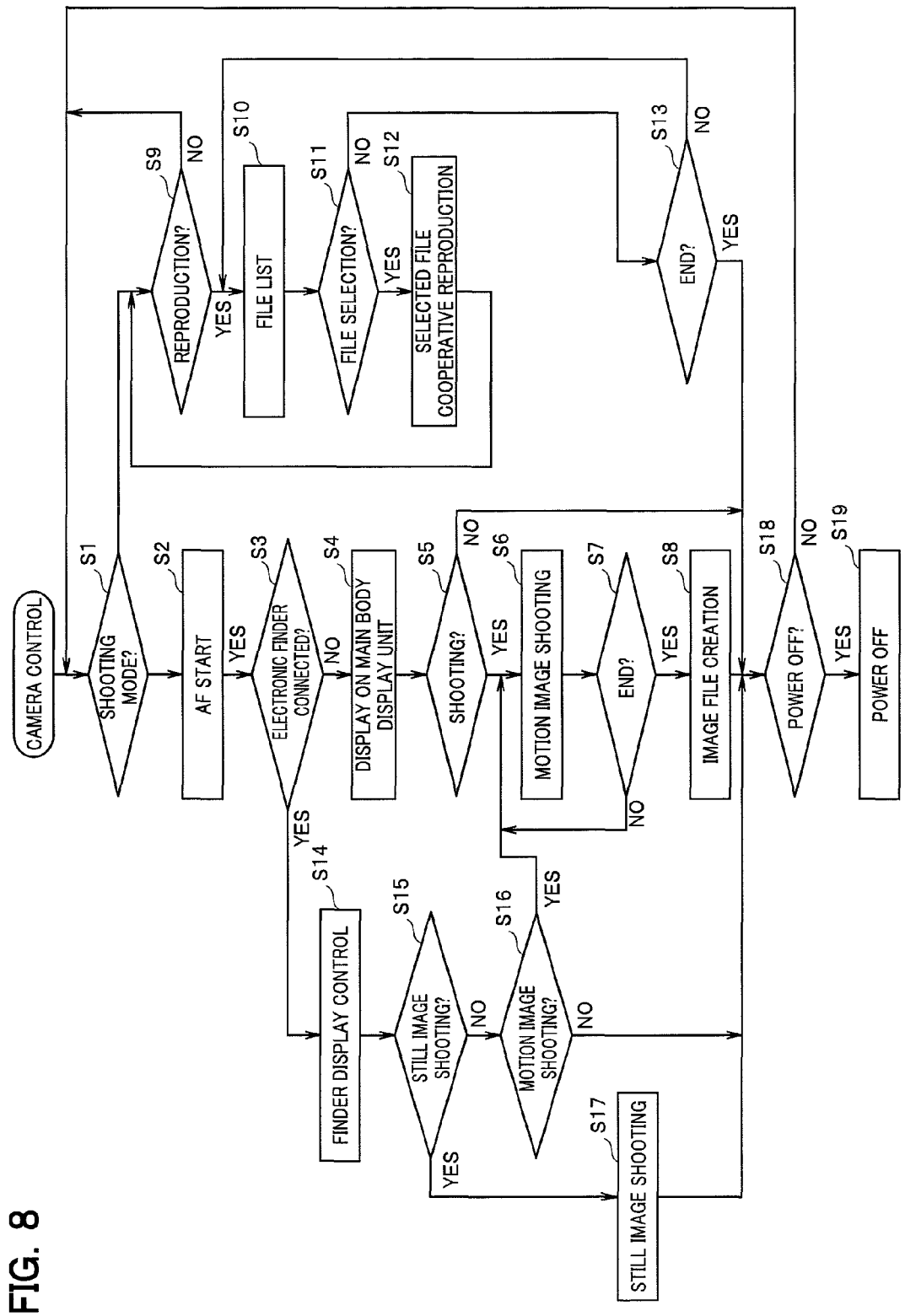
FIG. 8 is a flowchart illustrating camera control.
Figure 9:
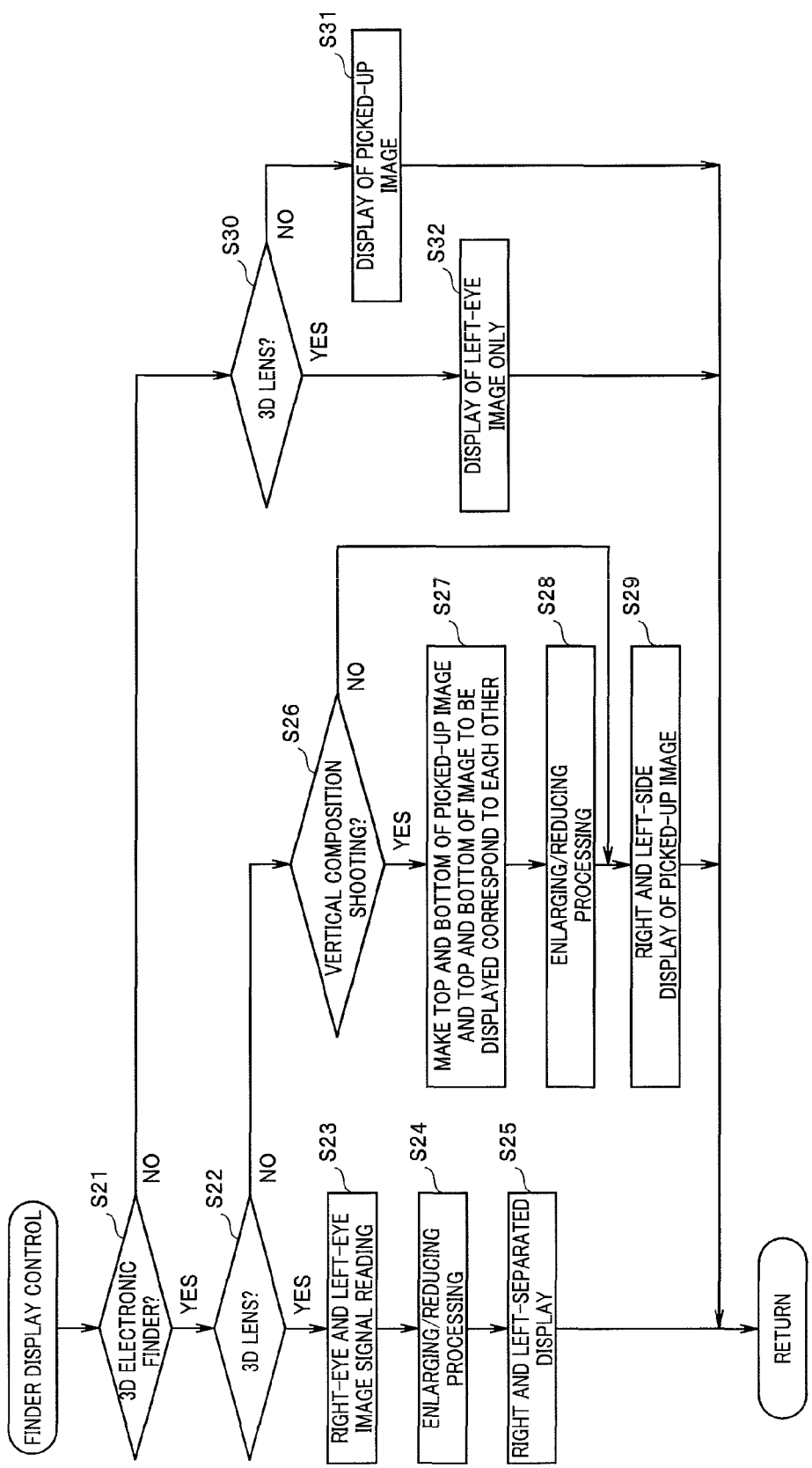
FIG. 9 is a flowchart illustrating a specific flow of finder control in step S14 in FIG. 8.

Next, an operation of the embodiment configured as described above will be described with reference to FIGS. 8 and 9. FIG. 8 is a flowchart illustrating camera control, and FIG. 9 is a flowchart illustrating a specific flow of finder display control in step S14 in FIG. 8.

In step S1 in FIG. 8, the signal processing and control unit 21 determines whether or not the mode is shooting mode. Now, it is supposed that an instruction to select shooting mode is provided. In this case, in step S2, the signal processing and control unit 21 performs auto-focusing control (AF), and loads signals from the image pickup unit 24 to perform signal processing to generate image signals.

Furthermore, when an instruction to select shooting mode has been provided, in step S3, the signal processing and control unit 21 determines whether or not an electronic finder is connected.

Now, it is assumed that an electronic finder is not connected to the accessory shoe 61 of the image pickup apparatus main body 11. In this case, the signal processing and control unit 21 outputs the generated image signals to the main body display unit 30 to display a picked-up image (step S4).

Next, in step S5, the signal processing and control unit 21 determines whether or not an instruction to start shooting is provided. If an instruction to start shooting is not provided, in step S18, the signal processing and control unit 21 determines whether or not a power-off operation is performed, and if a power-off operation is not performed, returns the processing to step S1. If a power-off operation is performed, the power is turned off in step S19.

If it has been determined in step S5 that a user has given an instruction to start shooting, the signal processing and control unit 21 performs motion image shooting (step S6). In FIG. 8, although the description has been made in terms of the case where motion image shooting is performed by the instruction to start shooting in the mode of display on the main body display unit 30, still image shooting may be performed.

When an instruction to end shooting is given, the signal processing and control unit 21 advances the processing from step S7 to step S8 to create an image file. In other words, the signal processing and control unit 21 performs coding processing on the generated image signals simultaneously with the shooting, and transfers the image information from the recording and reproducing unit 26 to a recording medium, and creates a file of the image information transferred to the recording and reproducing unit 26 in response to the instruction to end shooting.

Next, it is supposed that it has been determined in step S1 that an instruction to select reproduction mode is provided. In this case, the signal processing and control unit 21 advances the processing from step S9 to step S10, to read information on a list of files recorded in the recording and reproducing unit 26 and make the main body display unit 30 provide display of the file list.

During display of the file list, if a user selects a file (step S11), the signal processing and control unit 21 reads the selected file via the recording and reproducing unit 26 and performs decoding processing on the selected file to reproduce image signals and sound signals. The signal processing and control unit 21 provides the reproduced image signals and sound signals to the main body display unit 30 to make the main body display unit 30 display the signals (step S12).

During display of the file list, if an end operation is performed, the signal processing and control unit 21 advances the processing from step S11 to step S13 to end the reproduction mode.

In the present embodiment, display of picked-up images can be controlled based on finder information from the electronic finder, lens information from the interchangeable lens and vertical/horizontal direction detection information from the vertical/horizontal direction detecting unit 29.

In other words, if the signal processing and control unit 21 has determined in step S3 that an electronic finder is connected, the signal processing and control unit 21 advances the processing to step S14 to perform finder display control.

In finder display control, in step S21 in FIG. 9, the signal processing and control unit 21 determines whether or not the connected electronic finder is one for 3D display. Now, it is supposed that the electronic finder 13 is connected to the accessory shoe 61 of the image pickup apparatus main body 11. The signal processing and control unit 21 loads finder information via the communication unit 52 in the electronic finder 13 and the communication unit 23 in the main body circuit section 20. From the finder information, the signal processing and control unit 21 recognizes that the electronic finder 13 includes two display units 55R and 55L.

Next, in step S22, the signal processing and control unit 21 determines whether or not the interchangeable lens is a 3D interchangeable lens. Now, it is supposed that the interchangeable lens 12 is connected to the lens mount of the image pickup apparatus main body 11. The signal processing and control unit 21 loads lens information via the communication unit 42 in the interchangeable lens 12 and the communication unit 22 in the main body circuit section 20. From the lens information, the signal processing and control unit 21 recognizes that the interchangeable lens 12 includes lens units 44R and 44L including image pickup lenses 12R and 12L, respectively.

In this case, in step S23, the signal processing and control unit 21 reads right-eye and left-eye image signals. In other words, based on the lens information, the left and right image signal generating unit 21a in the signal processing and control unit 21 sets a right-eye image area and a left-eye image area according to light entering the respective lens units 44R and 44L. The left and right image signal generating unit 21a reads right-eye image signals and left-eye image signals from the respective image areas.

Next, in step S24, the signal processing and control unit 21 performs enlarging/reducing processing and frame image generation processing on the right-eye image and the left-eye image. The image sizes of the right-eye image and the left-eye image respond to the size of the image pickup plane of the image pickup device in the image pickup unit 24 and the light entrance range of the optical system. Thus, the image sizes of the right-eye and left-eye images may be different from the image sizes in the display units 55R and 55L of the electronic finder 13. Therefore, the signal processing and control unit 21 performs enlarging/reducing processing to adjust the image sizes of the right-eye and left-eye images to the image sizes in the display units 55R and 55L. Also, the signal processing and control unit 21 generates frame images according to the aspect ratios of the right-eye and left-eye images and the aspect ratios of the images to be displayed, and superimposes the frame images on the enlarged/reduced right-eye and left-eye images. Here, parallax adjustment results are reflected in the images. In other words, display is provided according to the results of determination by a user of parts having no parallax during observation with his/her eyes.

The signal processing and control unit 21 provides the generated right-eye and left-eye image signals to the finder control unit 51 in the electronic finder 13 via the communication units 23 and 52. The finder control unit 51 controls the display drive unit 54 to provide the right-eye image signals to the display unit 55R and the left-eye image signals to the display unit 55L (step S25), and returns the processing to the main routine. Consequently, the display device 55 in the electronic finder 13 provides 3D display based on the subject optical images picked up via the optical lens 12. At the timings of steps S24 and 25, a user's operation (of, e.g., a touch panel, a switch or a dial) is detected to make the aforementioned parallax adjustment.

FIGS. 10A and 10B, and FIGS. 11A and 11B are diagram specifically illustrating the processing in steps S23 to S25. FIGS. 10A and 10B and FIGS. 11A and 11B illustrate examples in which horizontal picked-up images and vertical picked-up images are obtained by an image pickup plane 90 of the image pickup device in the image pickup unit 24, respectively.

Figure 10A:
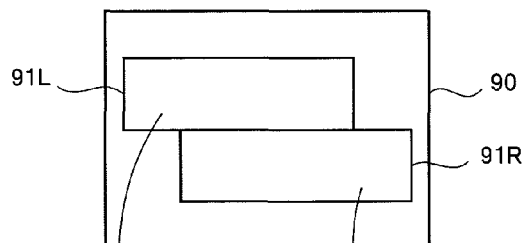
FIGS. 10A and 10B are diagrams specifically illustrating processing in step S S23 to S25.

A right-eye image area 91R and a left-eye image area 91L are set in the image pickup plane 90 in FIG. 10A. The image areas 91R and 91L are obtained by employing, for example, the optical system illustrated in FIGS. 6A and 6B for the lens units of the interchangeable lens.

Figure 11A:
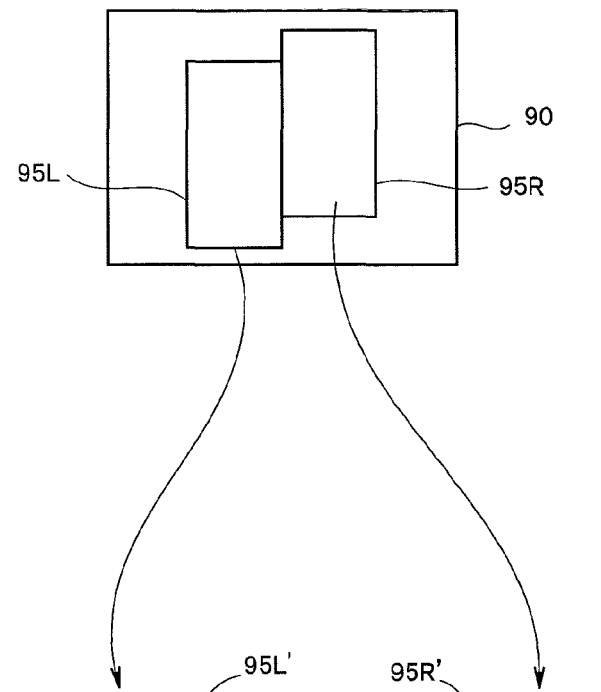
FIGS. 11A and 11B are diagrams specifically illustrating processing in step S S23 to S25.

A right-eye image area 95R and a left-eye image area 95L are set in the image pickup plane 90 in FIG. 11A. The image areas 95R and 95L are obtained by employing, for example, the optical system illustrated in FIGS. 7A and 7B for the lens units of the interchangeable lens.

As is clear from comparison between FIG. 10A and FIG. 11A, the image areas 91R and 91T in FIG. 11A are horizontally long compared with the image areas 95R and 95L in FIG. 11A. As described above, in FIG. 10A, horizontally-long picked-up images are obtained from the image pickup plane 90, and in FIG. 11A, vertically-long picked-up images are obtained from the image pickup plane 90.

For example, in a case where the optical system illustrated in FIGS. 6A and 6B are employed, the signal processing and control unit 21 performs the setting of the right-eye and left-eye image areas 91R and 91L illustrated in FIG. 10A in step S23.

Meanwhile, for example, in a case where the optical system illustrated in FIGS. 7A and 7B are employed, the signal processing and control unit 21 performs the setting of the right-eye and left-eye image areas 95R and 95L illustrated in FIG. 11A in step S23.

Figure 10B:
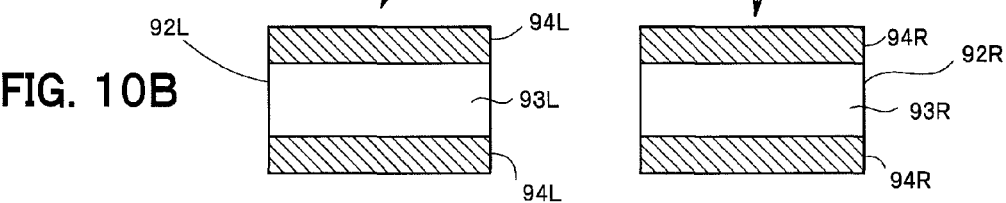

FIG. 10B illustrates an example of a right-eye image and a left-eye image read from the image areas 91R and 91L being displayed on the display units 55R and 55L in the electronic finder. In a display area 92R of the display unit 55R, a right-eye image display area 93R is provided in the center, and frame image areas 94R are provided in the upper and lower portions. The right-eye image read from the image area 91R is displayed in the right-eye image display area 93R of the display area 92R in the display unit 55R.

Similarly, in a display area 92L of the display unit 55L, a left-eye image display area 93L is provided in the center, and frame image areas 94L are provided in the upper and lower portions. The left-eye image read from the image area 91L is displayed in the left-eye image display area 93L of the display area 92L in the display unit 55L.

Figure 11B:
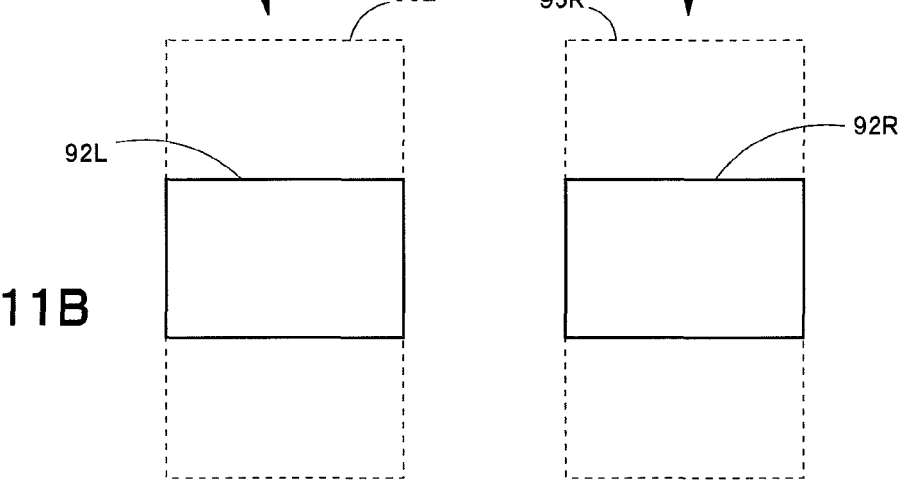

FIG. 11B illustrates an example of a right-eye image and a left-eye image read from the image areas 95R and 95L being displayed on the display units 55R and 55L in the electronic finder.

If the entire images read from the image areas 95R and 95L are enlarged/reduced to be displayed in the display areas 92R and 92L in the display units 55R and 55L, relatively, horizontally-long display frame images are formed on the respective right and left side portions of the display areas 92R and 92L, and the right-eye and left-eye images are displayed on relatively-narrow center areas of the display areas 92R and 92L.

Therefore, in consideration of, e.g., ease of viewing the image as well as realistic sensation, as illustrated FIG. 11B, a display method in which only central portions in the vertical direction of the images read from the image areas 95R and 95L are displayed in the entire display areas 92R and 92L is employed.

In other words, the signal processing and control unit 21 makes the display units 55R and 55L display center image portions in the vertical direction of the images 95R' and 95L' obtained as a result of enlarging the images read from the image areas 95R and 95L.

Consequently, eye-friendly images whose horizontal wideness viewed from the eyes is prioritized can be provided. Furthermore, this finder display method is more practical also considering the case where a taken picture is displayed on, e.g., a widescreen TV.

Here, it is supposed that a user gives an instruction to shoot a still image while viewing the 3D display. Then, the signal processing and control unit 21 advances the processing from step S15 to step S17 in FIG. 8 to perform still image shooting. In other words, the signal processing and control unit 21 performs processing to compress still images of the right-eye and left-eye images at the timing of the shooting instruction, and records the images in the recording medium via the recording and reproducing unit 26 (step S8). Furthermore, the signal processing and control unit 21 displays the still images of the right-eye and left-eye images on the display units 55R and 55L for a fixed period of time.

Also, it is assumed that a user gives an instruction to shoot a motion image while viewing the 3D display. In this case, the signal processing and control unit 21 advances the processing from steps S15 and S16 to step S6 to perform motion image shooting.

As described above, during shooting, a user can shoot a 3D still image and a motion image while viewing 3D display.

Furthermore, in the present embodiment, a 2D shooting interchangeable lens can be used for the interchangeable lens. Now, it is supposed that the interchangeable lens 70 illustrated in FIG. 3B is attached as the interchangeable lens. In this case, the signal processing and control unit 21 advances the processing from step S22 to step S26 to determine whether or not the image pickup apparatus main body 11 is in a state in which vertical composition shooting can be performed.

In other words, the signal processing and control unit 21 determines whether the image pickup apparatus main body 11 is held horizontally or vertically, based on vertical/horizontal direction detection information from the vertical/horizontal direction detecting unit 29. Now, it is supposed that the image pickup apparatus main body 11 is held in a horizontal position (a horizontal composition shooting state). In this case, the signal processing and control unit 21 outputs image signals obtained as a result of picking up an image directly to the finder control unit 51. The display drive unit 54 in the finder control unit 51 provides the image signals to the two display units 55R and 55L based on display control information from the signal processing and control unit 21. Consequently, images identical to each other based on the subject optical image loaded via the image pickup lens 71 are displayed on the display units 55R and 55L (step S29).

Here, it is supposed that the image pickup apparatus main body 11 is vertically held as illustrated in FIG. 3B. In this case, it is supposed that the line connecting the display units 55R and 55L in the electronic finder 13 is horizontal.

In this case, in step S27, the signal processing and control unit 21 determines whether the rotational angle of the position of the image pickup apparatus main body 11 is 90 or 270 degrees, based on the vertical/horizontal direction detection information. Then, the signal processing and control unit 21 rotates the picked-up image by 90 or 270 degrees based on the vertical/horizontal direction detection information to provide correspondence between the top and bottom of the picked-up image and those of image to be displayed on the display units 55R and 55L in the electronic finder 13.

Next, in step S28, the signal processing and control unit 21 performs enlarging/reducing processing and frame image generation processing on the picked-up image. Consequently, the size and aspect ratio of the picked-up image are made to correspond to those of displayed images. As a result, in step S29, the picked-up image including frame images are supplied to and displayed on the display units 55R and 55L.

Furthermore, in the present embodiment, a 2D display electronic finder can be used as the electronic finder. Now, it is supposed that a 2D display electronic finder is attached as the electronic finder. In this case, the signal processing and control unit 21 advances the processing from step S21 to step S30 to determine whether or not the interchangeable lens is one for 3D shooting.

If the interchangeable lens is one for 2D shooting, that is, if the interchangeable lens and the electronic finder are ones for 2D shooting, in step S31, the signal processing and control unit 21 provides the image signals based on the picked-up image directly to the display units in the 2D electronic finder to make the display units provide display based on the image signals. Consequently, the picked-up two dimensional image is displayed by the electronic finder.

If the interchangeable lens is one for 3D shooting, that is, if right-eye and left-eye images are picked up by the image pickup unit 24, in step S32, the signal processing and control unit 21 provides left-eye image signals to the display units 55R and 55L to make the display units 55R and 55L provide display the left-eye image signals. Consequently, the left-eye image is displayed on both of the display units 55R and 55L. It is clear that right-eye image signals may be provided to the display units 55R and 55L in step S32. Also, in step S32, a user may perform vertical composition shooting. In this case, the signal processing and control unit 21 may rotate the left-eye image by 90 degrees based on the vertical/horizontal direction detection information so as to provide correspondence between the top and bottom of the left-eye image and those of an image to be displayed, and the left-eye image is then displayed on the display units 55R and 55L.

Figure 12A:
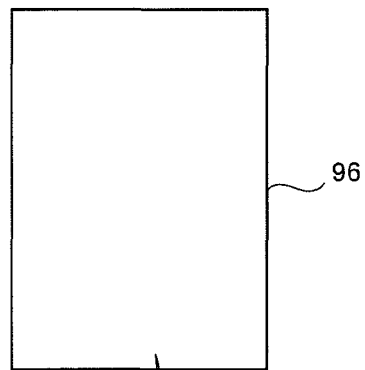
FIGS. 12A and 12B are diagrams specifically illustrating processing in step S31.
Figure 12B:
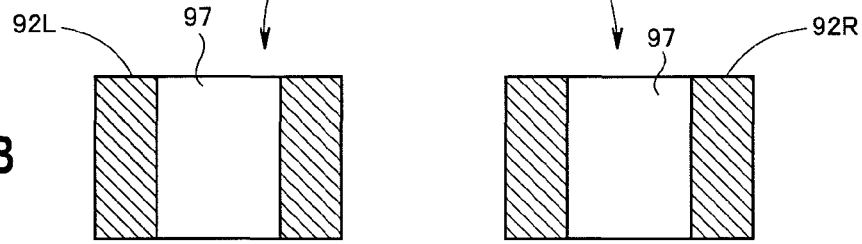

FIGS. 12A and 12B are diagrams illustrating the processing in step S31. FIG. 12A illustrates an example in which an image pickup device including a vertically-long image pickup plane 96 is employed as the image pickup unit 24. An image obtained by the image pickup plane 96 in FIG. 12A is subjected to enlarging/reducing processing, and then, as illustrated in FIG. 12B, is displayed in the display areas 92R and 92L in the display units 55R and 55L as images 97.

As described above, in the present embodiment, a user can perform 3D still image or motion image shooting while viewing 3D display during the shooting. Also, in the present embodiment, besides the ability to perform 3D shooting and 2D shooting, switching between these modes of shooting can extremely easily be performed. Furthermore, whether the electronic finder is one for 3D display or 2D display, the electronic finder can provide display suitable for the mode of display. In other words, whether the interchangeable lens is one for 3D shooting or 2D shooting and whether the electronic finder is one for 3D display or 2D display, proper display can be provided according to combination of the interchangeable lens and electronic finder.

Also, the aforementioned invention disclosed in Japanese Patent Application Laid-Open Publication No 2006-165601 employs a method for generating a 3D image using two image pickup units, causing the need to temporally synchronize images obtained by two image pickup devices. Unsynchronized left and right images cannot successfully provide stereoscopic vision. In particular, in a case where a moving object is shot, left and right images that are shifted from each other in time series tend to be generated.

Meanwhile, in the present embodiment, use of a single image pickup unit can solve this problem at a low cost.

(Second Embodiment)

FIG. 13 is a flowchart illustrating a second embodiment of the present invention. In FIG. 13, steps that are the same to those in FIG. 9 are provided with the same reference numerals, and a description thereof will be omitted. A hardware configuration according to the present embodiment is similar to that of the first embodiment in FIGS. 1 and 2. The present embodiment is different from the first embodiment only in that display control according to the interchangeable lens type is performed.

In 3D shooting in the first embodiment, two image areas are set in an image pickup plane of one image pickup device to obtain a right-eye image and a left-eye image from the respective areas. In this case, if the optical system illustrated in FIGS. 6A and 6B are employed as lens units of an interchangeable lens, a horizontally-long image is obtained, and if the optical system illustrated in FIGS. 7A and 7B are employed, a vertically-long image is obtained. Considering effective use of the image pickup plane of the image pickup device, it is better to use the optical system illustrated in FIGS. 6A and 6B. In this case, also, if a generally-used 2D image pickup device is employed, resulting right-eye and left-eye images are horizontally-long images.

Compared with such right-eye and left-eye images, the display areas of the display units in the electronic finder are somewhat vertically long. Accordingly, in a case where a right-eye image area and a left-eye image area are set one above the other in the image pickup plane of the image pickup device, optical systems in the lens units are properly set and the image pickup plane of the image pickup device is vertically arranged, enabling effective use of the image pickup plane.

Figure 14A:
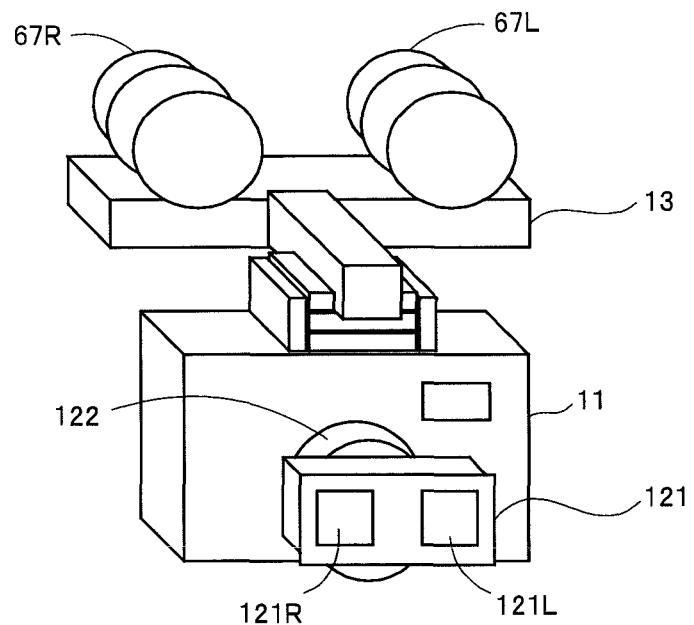
FIGS. 14A and 14B are diagram illustrating an interchangeable lens employed in a second embodiment of the present invention.
Figure 14B:
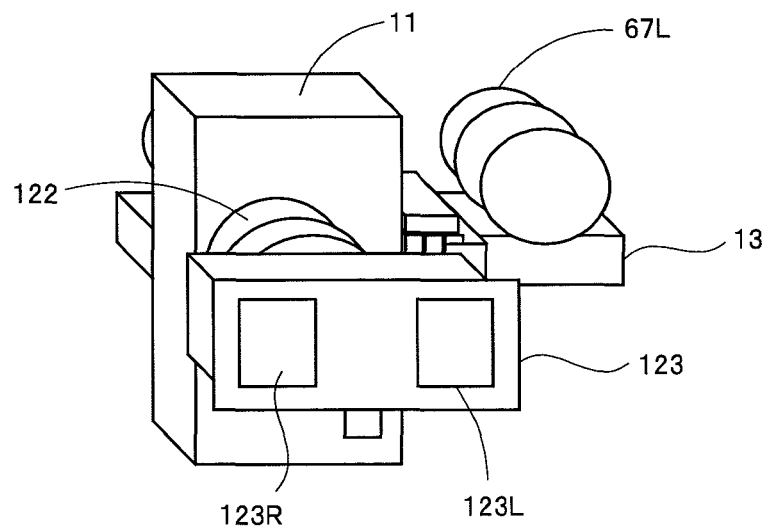

Therefore, in the present embodiment, the interchangeable lens is switched to another and finder display control is performed based on whether the image pickup device is horizontally arranged or vertically arranged FIGS. 14A and 14B are diagrams illustrating an interchangeable lens employed in the present embodiment.

FIG. 14A illustrates a state in which an interchangeable lens 121 is attached to the lens mount (not illustrated) of the image pickup apparatus main body 11. The interchangeable lens 121 is attached to the lens mount via an attachment unit 122 in such a manner that the interchangeable lens 121 can rotate with reference to the optical axis. The interchangeable lens 121 includes image pickup lenses 121R and 121L enabling picking-up of a right-eye image and a left-eye image. The interchangeable lens 121 is rotated relative to the image pickup apparatus main body 11, enabling the baseline connecting the image pickup lenses 121R and 121L to be maintained to be horizontal, whether the image pickup apparatus main body 11 is held at a position in rotation for horizontal composition shooting or at a position in rotation for vertical composition shooting.

FIG. 14B illustrates a state in which an interchangeable lens 123 is attached to the lens mount (not illustrated) of the image pickup apparatus main body 11. The interchangeable lens 123 is attached to the lens mount via the attachment unit 122 so that the interchangeable lens 123 can rotate with reference to the optical axis. The interchangeable lens 123 includes image pickup lenses 123R and 123L enabling picking-up of a right-eye image and a left-eye image. The interchangeable lens 123 is rotated relative to the image pickup apparatus main body 11, enabling the baseline connecting the image pickup lenses 123R and 123L to be maintained to be horizontal, whether the image pickup apparatus main body 11 is held at a position in rotation for horizontal composition shooting or at a position in rotation for vertical composition shooting.

In the present embodiment, compared with the interchangeable lens 121, the interchangeable lens 123 can form an image of a subject on a wider area of the image pickup plane of the image pickup device.

If it has been determined in steps S21 and S22 in FIG. 13 that the electronic finder and the interchangeable lens are ones for 3D images, in the following step S41, the signal processing and control unit 21 determines whether or not the image pickup device is horizontally arranged.

Now, it is supposed that when the image pickup apparatus main body 11 is in the horizontal composition shooting state illustrated in FIG. 14A, the image pickup plane of the image pickup device is horizontally arranged. In this case, if the image pickup apparatus main body 11 is in a vertical composition shooting state, the image pickup plane of the image pickup device is vertically arranged. Even in the vertical composition shooting state, the baseline connecting the image pickup lenses 121R and 121L and the baseline connecting the image pickup lenses 123R and 123L are maintained to be horizontal, enabling 3D shooting.

If the image pickup apparatus main body 11 is in the horizontal composition shooting state, in step S42, the signal processing and control unit 21 sets image areas for horizontal composition shooting, and if the image pickup apparatus main body 11 is in the vertical composition shooting state, in step S43 the signal processing and control unit 21 sets image areas for vertical composition shooting.

Figure 15A:
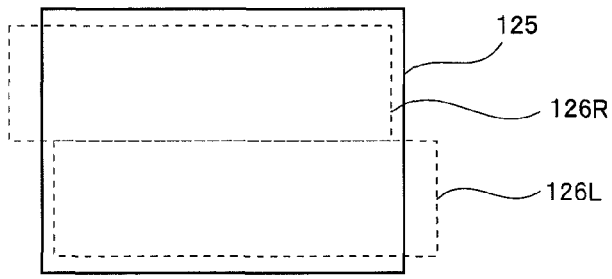
FIGS. 15A and 15B are diagrams illustrating right-eye and left-eye image areas set in an image pickup plane of an image pickup device.
Figure 15B:
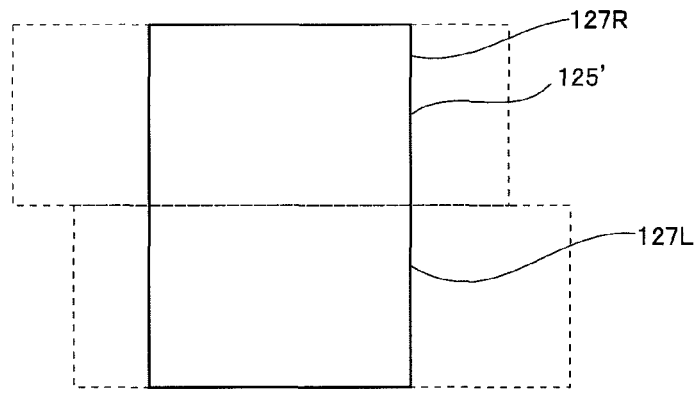

FIGS. 15A and 15B are diagrams illustrating right-eye and left-eye image areas set in an image pickup plane of an image pickup device. FIG. 15A illustrates image areas for horizontal composition shooting and FIG. 15B illustrates image areas for vertical composition shooting.

FIG. 15A illustrates an image pickup plane 125 of an image pickup device for horizontal composition shooting. A right-eye image area 126R and a left-eye image area 126L are set in the image pickup plane 125 by the signal processing and control unit 21.

In FIG. 15A, since the right-eye and left-eye image areas 126R and 126L are arranged one above the other in the image pickup plane 125, the resulting images are inevitably vertically narrow. Thus, when a 3D image of a tall subject is shot, the image areas 126R and 126L cannot cover a sufficient shooting range.

Therefore, if a user wishes to secure a sufficient shooting range in the vertical direction, vertical composition shooting is employed. In other words, in this case, using the interchangeable lens 123, the image pickup apparatus main body 11 is made to be in the vertical composition shooting state with the baseline connecting the image pickup lenses 123R and 123L maintained to be horizontal. Consequently, the image pickup plane 125 of the image pickup device becomes a vertically-long image pickup plane 125'.

In this case, a right-eye image area 127R and a left-eye image area 127L are set in the image pickup plane 125'. The right-eye image area 127R and the left-eye image area 127L cannot include the entire picked-up images indicated by the dashed lines since the image formation ranges of the interchangeable lens 123 are wider. However, although the respective opposite end parts in the horizontal direction of the images are sacrificed, images with an aspect ratio suitable for providing 3D depiction of, e.g., a building can be obtained.

In step S44, the signal processing and control unit 21 performs enlarging/reducing processing. Consequently, the right-eye image and the left-eye image subsequent to the enlarging/reducing processing are displayed on the display units 55R and 55L in the electronic finder 13 (step S25).

Meanwhile, if it has been determined in steps S21 and S30 in FIG. 13 that the electronic finder is one for 2D display and the interchangeable lens is one for 3D shooting, in the following step S46, the signal processing and control unit 21 determines whether or not the image pickup device is horizontally arranged. The signal processing and control unit 21 sets image areas for horizontal composition shooting in step S47 if the image pickup apparatus main body 11 is in the horizontal composition shooting state, and sets image areas for vertical composition shooting in step S48 if the image pickup apparatus main body 11 is in the vertical composition shooting.

Next, in step S49, the signal processing and control unit 21 generates an intermediate image. For example, the signal processing and control unit 21 estimates corresponding points between the right-eye image and the left-eye image to generate an image to interpolate between the images. Then, in step S50, the signal processing and control unit 21 makes the display units 55R and 55L display the intermediate image.

Processing in the case where it has been determined in steps S22 and S30 that the interchangeable lens is one for 2D shooting is similar to that in FIG. 9, and a description thereof will be omitted. In this case, an image picked up by a 2D image pickup lens 71 (see FIG. 3B) may be displayed on the right and left display units 55R and 55L.

As described above, the present embodiment enables provision of an advantage similar to that in the first embodiment, and also enables performance of image area setting and enlarging/reducing processing according to the direction of the long side of the image pickup device and the interchangeable lens type. Also, in a case where a 3D image is subjected to 2D display, display using the features of a 3D image can be provided.

Although the present embodiment has been described in terms of an example in which an image pickup device whose image pickup plane is horizontally positioned during horizontal composition shooting is employed, an image pickup device whose image pickup plane is vertically positioned during horizontal composition shooting may be employed. In this case, it is clear that a 3D image can be picked up effectively using the image pickup device without rotating the image pickup apparatus main body by 90 degrees.

(Third Embodiment)

Figure 16:
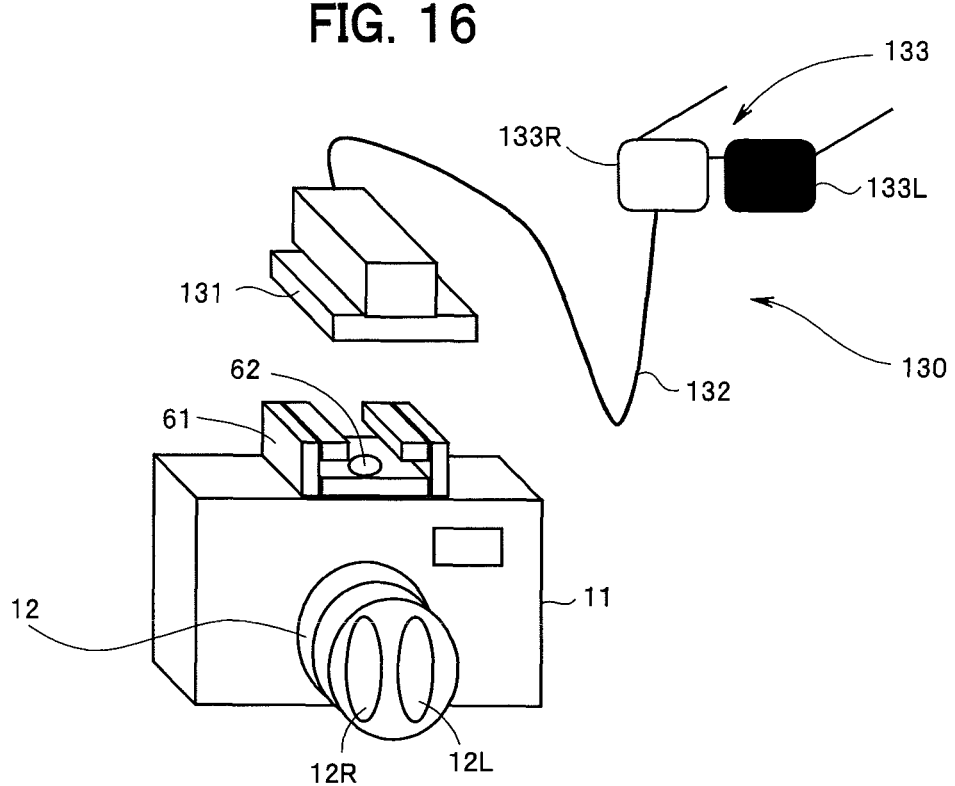
FIG. 16 is a diagram illustrating connection between an interchangeable lens 12 and an electronic component 130 in a third embodiment of the present invention.
Figure 17:
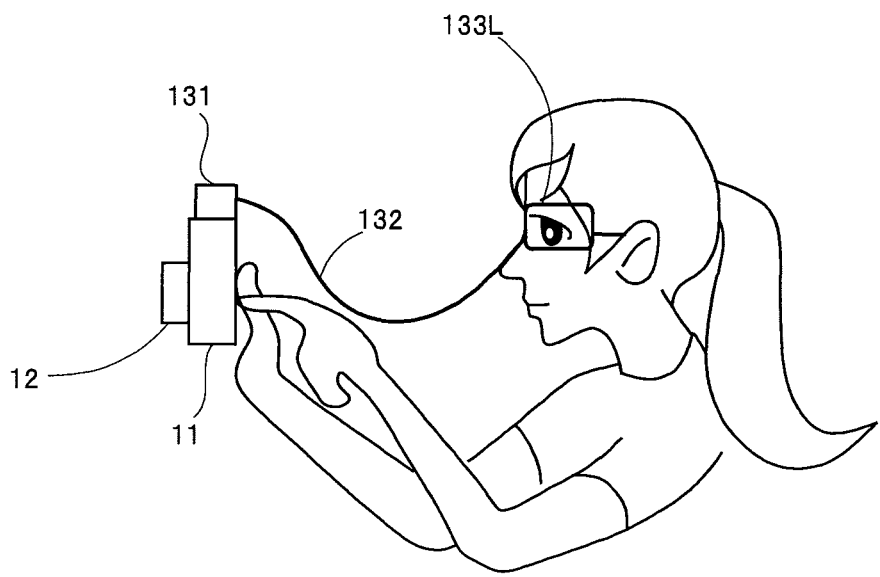
FIG. 17 is a diagram illustrating the third embodiment of the present invention.
Figure 18:
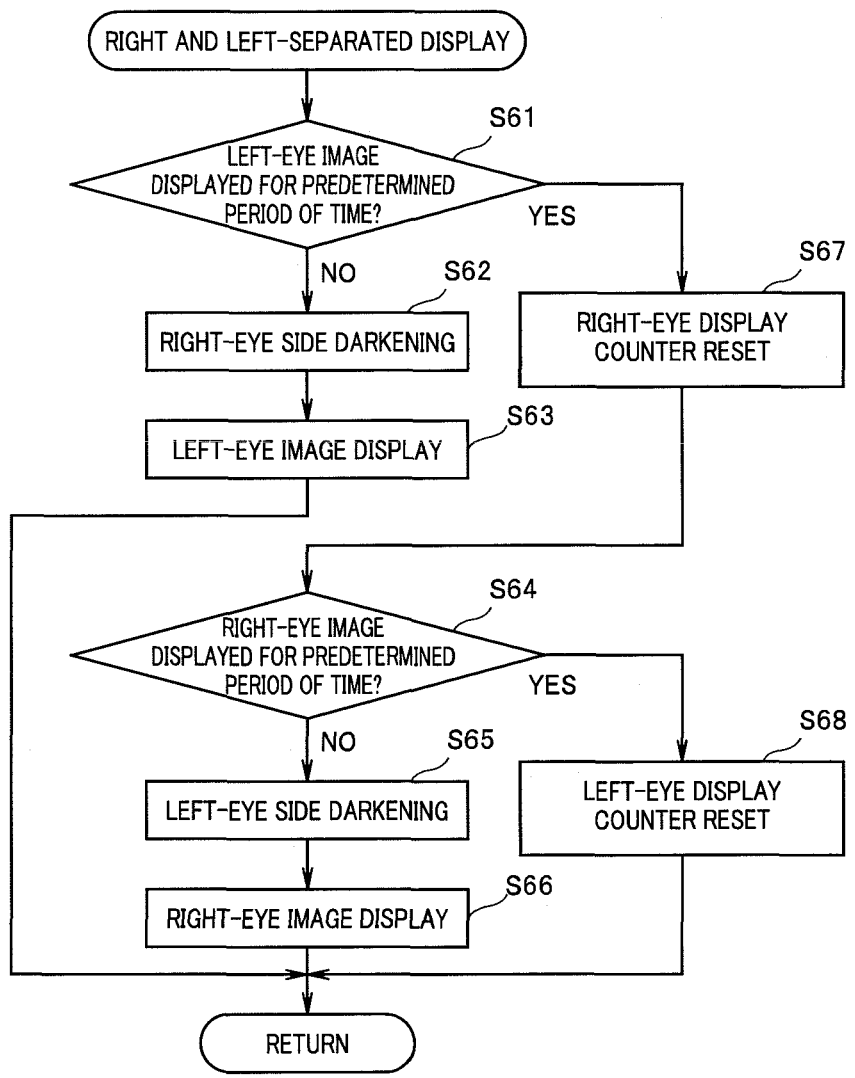
FIG. 18 is a flowchart illustrating an operation of the third embodiment of the present invention.

FIGS. 16 to 18 relate to a third embodiment of the present invention: FIG. 16 is a diagram illustrating the connection between an interchangeable lens 12 and an electronic component 130; FIG. 17 is a diagram illustrating usage; and FIG. 18 is a flowchart illustrating an operation flow. In FIG. 16, components that are the same as those in FIGS. 3A and 3B are provided with the same reference numerals, and a description thereof will be omitted.

A hardware configuration according to the present embodiment is similar to that of the first embodiment in FIGS. 1 and 2. The present embodiment is different from the first embodiment only in that an apparatus is used with an electronic component 130 attached to a main body thereof instead of the electronic finder 13.

The electronic component 130 includes an attachment unit 131, a signal cable 132 and electronic glasses 133. The attachment unit 131 can be detachably attached to an accessory shoe 61 on a top side of an image pickup apparatus main body 11. As a result of attaching the attachment unit 131 to the accessory shoe 61, a contact unit 62 is electrically connected to a contact unit (not illustrated) provided in the attachment unit 131. Consequently, a communication unit 23 of a main body circuit section 20 (see FIG. 1) can transmit/receive signals to/from the electronic glasses 133 via the signal cable 132.

The electronic glasses 133 include electronic shutters 133R and 133L at positions corresponding to right and left eyes. The electronic shutters 133R and 133L can mutually independently limit the amount of light entering the eyes under control of the signal processing and control unit 21.

Also, in the present embodiment, the signal processing and control unit 21 alternately supplies right-eye image signals and left-eye image signals by time sharing to a main body display unit 30. Consequently, a right-eye image and a left-eye image are alternately displayed by time sharing on the main body display unit 30.

The signal processing and control unit 21 controls the electronic shutters 133R and 133L in the electronic glasses 133 in synchronization with the display on the main body display unit 30. In other words, the signal processing and control unit 21 blocks light entering the electronic shutter 133L at a timing when a right-eye image is displayed on the main body display unit 30, and blocks light entering the electronic shutter 133R at a timing when a left-eye image is displayed on the main body display unit 30.

FIG. 17 illustrates a state in which a user wearing the electronic glasses 133 views and checks display on the main body display unit 30. The user views 3D display on the main body display unit 30 whose display area is provided on, for example, a back surface of the image pickup apparatus main body 11, with wearing the electronic glasses 133. In this embodiment, as illustrated in the Figure, a parallax adjustment may be made so as to eliminate parallax at a touched position in an image. Here, if a large parallax exits between the left and right images, it is difficult to determine which image from the left and right images should be the base for overlapping these images, and thus, for example, if there is a clear subject image, such as a face image, near the touched part, such subject image is preferentially determined to be the base. It should be noted that for a panel on the back surface, one having a speed high enough to follow the aforementioned left and right image display timings is supposed to be employed.

Next, an operation of the embodiment configured as described above will be described with reference to FIG. 18. FIG. 18 illustrates display processing corresponding to that in FIG. 9.

The signal processing and control unit 21 makes the main body display unit 20 display a left-eye image and a right-eye image with the images switched by time sharing. In this case, the signal processing and control unit 21 switches display of the respective images for a predetermined period of time using time information from a clock unit 27.

Now, it is supposed that a left-eye image is being displayed. The signal processing and control unit 21 starts counting up by means of a left-eye display counter from the start of display of the left-eye image using the time information. In step S61 in FIG. 18, the signal processing and control unit 21 determines whether or not a predetermined period of display time has passed from the start of display of the left-eye image, based on the counter value of the left-eye display counter. If the predetermined period of display time has not passed, the signal processing and control unit 21 continues closing of the right-eye-side electronic shutter 133R (step S62), thereby blocking the light entering the right eye. Then, in step S63, the signal processing and control unit 21 provides left-eye image signals to the main body display unit 30 to make the main body display unit 30 continue the display of the left-eye image, and returns the processing to the main routine in FIG. 9.

If the signal processing and control unit 21 has determined from the counter value of the left-eye display counter that the predetermined period of display time has passed from the start of display of the left-eye image, the signal processing and control unit 21 advances the processing from step S61 to step S67 to reset a right-eye display counter, and then advances the processing to step S64. In step S64, the signal processing and control unit 21 determines whether or not the right-eye image has been displayed for the predetermined period of time, from the count value of the right-eye display counter, and in the following step S65, closes the left-eye-side electronic shutter 133L, thereby blocking light entering the left eye. Next, in step S66, the signal processing and control unit 21 provides right-eye image signals to the main body display unit 30 to make the main body display unit 30 display a right-eye image, and returns the processing to the main routine in FIG. 9.

When the signal processing and control unit 21 has determined from the counter value of the right-eye display counter that the predetermined period of display time has passed from the start of display of the right-eye image, the signal processing and control unit 21 advances the processing from step S64 to step S68 to reset the left-eye display counter, and then returns the processing to the main routine.

When the signal processing and control unit 21 has advanced the processing from the main routine to step S61, the signal processing and control unit 21 determines whether or not the left-eye image has been displayed for the predetermined period of display time from the count value of the left-eye display counter.

Subsequently, the signal processing and control unit 21 repeats an operation similar to the above, thereby blocking light entering the left eye by means of the electronic shutter 133L while making the main body display unit 30 display the right-eye image for the predetermined period of time, and then blocking light entering the right eye by means of the electronic shutter 133R while making the main body display unit 30 display the left-eye image for the predetermined period of time. Consequently, 3D display using the main body display unit 30 can be provided.

As described above, in the present embodiment, 3D display can be provided by the main body display unit 30 including only one display unit.

(Fourth Embodiment)

Figure 19:
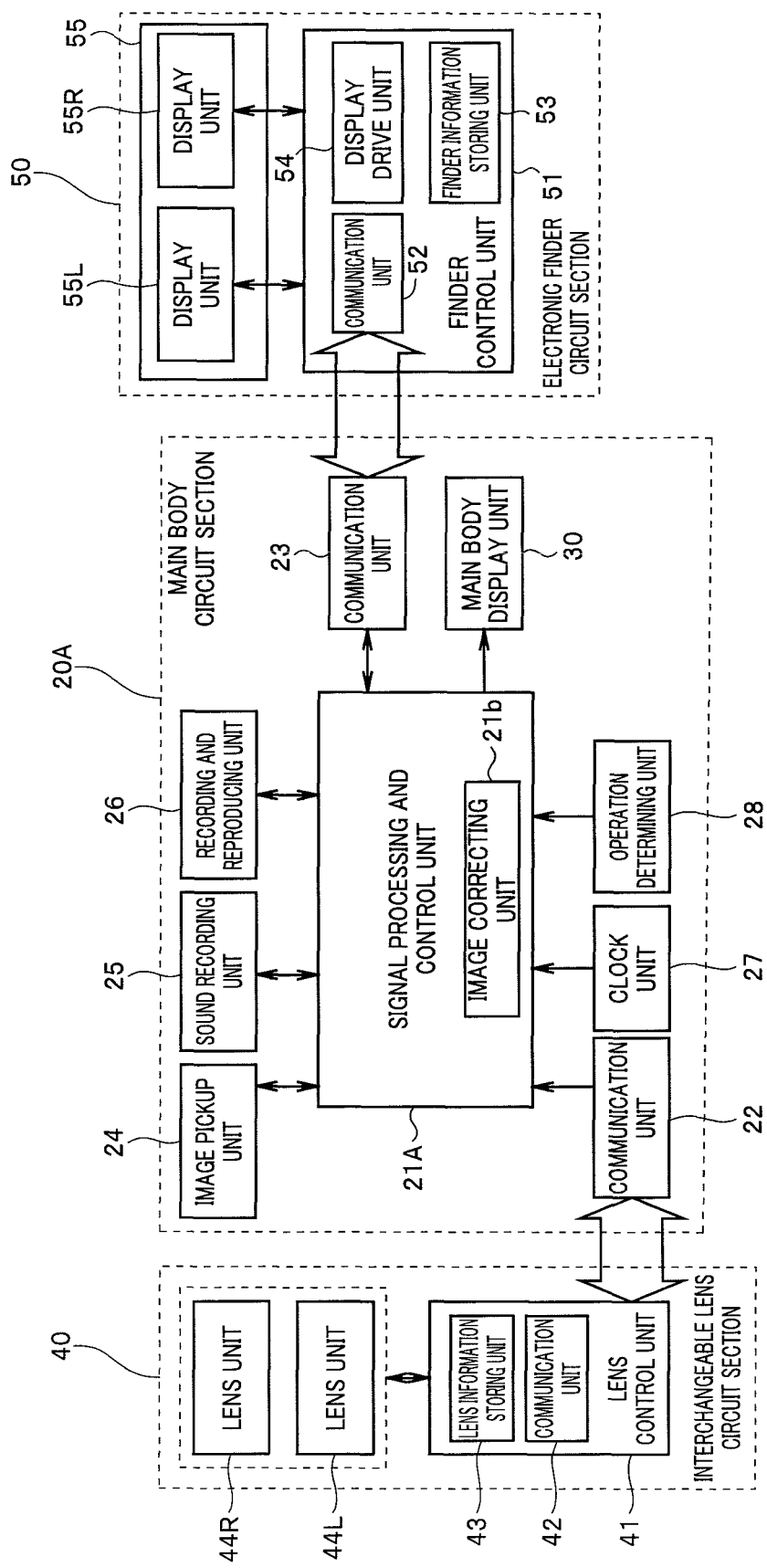
FIG. 19 is a block diagram illustrating a circuit configuration of an image pickup apparatus according to a fourth embodiment of the present invention.

FIG. 19 is a block diagram illustrating a circuit configuration of an image pickup apparatus according to a fourth embodiment of the present invention. The image pickup apparatus according to the present embodiment includes the appearance illustrated in FIGS. 2, 3A and 3B, and allows an interchangeable lens and an electronic finder to be attached thereto as well.

(Circuit Configuration)

An image pickup apparatus main body 11 of an image pickup apparatus 10 includes a main body circuit section 20A inside. As illustrated in FIG. 19, the main body circuit section 20A is provided with communication units 22 and 23. Meanwhile, an interchangeable lens 12 employed in the present embodiment includes an interchangeable lens circuit section 40 inside. In the present embodiment, various types of interchangeable lenses other than the interchangeable lens 12 illustrated in FIGS. 2, 3A and 3B can be employed, and the interchangeable lens employed in the present embodiment also includes an interchangeable lens circuit section 40 inside. An electronic finder 13 includes an electronic finder circuit section 50 inside. The interchangeable lens circuit section 40 and the electronic finder circuit section 50 are provided with communication units 42 and 52, respectively. The communication units 22 and 23 in the main body circuit section 20A can transmit/receive information to/from the communication unit 42 in the interchangeable lens circuit section 40 and the communication unit 52 in the electronic finder circuit section 50, respectively.

In the present embodiment, for the interchangeable lens 12, one for 3D shooting including two image pickup lenses 12R and 12L (see FIG. 2), enabling pickup of a right image and a left image, can be employed.

A lens control unit 41 in the interchangeable lens circuit section 40 includes a lens information storing unit 43 that stores lens information. Here, the interchangeable lens circuit section 40 is one for 3D shooting including two lens units 44R and 44L including two image pickup lenses corresponding to the image pickup lenses 12R and 12L, respectively. The lens control unit 41 is configured so as to drive the lens unit 44R, 44L to control, e.g., the diaphragm, focus and zooming of, e.g., the image pickup lenses 12R and 12L, respectively, under the control of the main body circuit section 20A.

The lens information stored in the lens information storing unit 43 includes information on a lens optical system. Optical images formed on an image pickup device via lens systems may suffer various reproducibility defects such as distortion, image inclination, image darkening in which four corners of the image darken, overlap of left and right images and color reproducibility defects. In the present embodiment, the lens information also includes correction factor data for correcting various reproducibility defects such as the aforementioned optical image displacement and deformation. In other words, the correction factor data includes a lens type, a baseline length of lenses and error information specific to the interchangeable lens.

The correction factor data also includes information on, e.g., an F number, zooming and focusing. Furthermore, for the interchangeable lens, a lens enabling adjustment of lens systems of left and right image pickup lenses in terms of, e.g., rotational angles and baseline length may be employed, and changed rotational angle information and baseline length information are also included in the correction factor data. In other words, the correction factor data includes fixed values specific to each interchangeable lens to be attached to the apparatus, and variable values varying according to changes in the lens state after the start of camera control, which are caused as a result of, e.g., zooming processing, focusing processing, and rotational angle and baseline length change processing.

The communication unit 42 in the lens control unit 41 transmits/receives information to/from the communication unit 22 in the main body circuit section 20A via a predetermined transmission channel. When communication between the lens control unit 41 and the communication unit 22 in the main body circuit section 20A has been established, the lens control unit 41 can transmit lens information read from the lens information storing unit 43 to the main body circuit section 20A via the communication unit 42. Consequently, the main body circuit section 20A obtains various information relating to the lens systems in the interchangeable lens 12. For example, the main body circuit section 20A can obtain information on which area in the image pickup plane of an image pickup device, which will be described later, an optical image of a subject from each of the image pickup lenses 12R and 12L is formed, and what types of defects, e.g., distortion and/or rotation, have occurred, and information for correcting such defects.

Meanwhile, for the electronic finder 13, a 3D display finder enabling display of a right image and a left image by means of a display device 55 including two display units 55R and 55L, respectively, can be employed. In the electronic finder 13, as illustrated in FIG. 2, the display units 55R and 55L are provided with a space therebetween, the space corresponding to, e.g., the space between the eyes of a human. The display units 55R and 55L can include organic ELs and LCDs.

A finder control unit 51 in the electronic finder circuit section 50 is provided with a finder information storing unit 53. The finder information storing unit 53 holds finder information relating to the display device 55 in the electronic finder 13.

The communication unit 52 in the finder control unit 51 transmits/receives information to/from the communication unit 23 in the main body circuit section 20A via a predetermined transmission channel. When communication between the finder control unit 51 and the communication unit 23 in the main body circuit section 20A has been established, the finder control unit 51 can transmit the finder information stored in the finder information storing unit 53 to the main body circuit section 20A via the communication unit 52. Consequently, the main body circuit section 20A can recognize that the display device 55 include two display units 55R and 55L.

When the finder control unit 51 has received image information from the main body circuit section 20A, the finder control unit 51 generates image signals based on the image information by means of a display drive unit 54. Since the main body circuit section 20A has also outputted display control information regarding a manner of display in the display device 55, the display drive unit 54 provides the image signals to the display device 55 based on the display control information to make the display device 55 display the image signals.

For example, when the display drive unit 54 has received 3D display image information from the main body circuit section 20A, the display drive unit 54 provides right image signals to the display unit 55R and left image signals to the display unit 55L based on the display control information.

Consequently, a user can view a 3D image by looking into the display units 55R and 55L in the electronic finder 13 with his/her eyes.

The main body circuit section 20A includes an image pickup unit 24 including an image pickup device such as a CCD or CMOS sensor. An optical image of a subject from the interchangeable lens 12 is formed on an image pickup plane of an image pickup device included in the image pickup unit 24. The image pickup unit 24 is driven under control of a signal processing and control unit 21A. The signal processing and control unit 21A holds information on the image pickup plane of the image pickup device included in the image pickup unit 24. The signal processing and control unit 21A outputs a drive signal for the image pickup device to the image pickup unit 24 based on the information on the image pickup plane and the lens information, and loads image signals that the image pickup device has obtained as a result of photoelectric conversion of an optical image. Also, the main body circuit section 20A includes a sound recording unit 25, which records sounds outside the image pickup apparatus 10 and outputs sound signals to the signal processing and control unit 21A.

The signal processing and control unit 21A performs predetermined signal processing, for example, color signal generation processing, matrix conversion processing and other various types of digital processings, on the image signals obtained as a result of photoelectric conversion by the image pickup device. In recording, e.g., the image signals and the sound signals, the main body circuit section 20A can also perform coding processing on, e.g., the image signals and the sound signals to output, e.g., compressed image information and sound information.

The signal processing and control unit 21A sets image areas according to the ranges of incoming light from the lens units 44R and 44L in the image pickup plane of the image pickup unit 24 based on the information on the image pickup plane and the lens information. In other words, the signal processing and control unit 21A divides the image pickup plane of the image pickup unit 24 into a right image area and a left image area according to the respective ranges of the incoming light from the respective lens units 44R and 44L, and performs signal processing of image signals from the respective image areas as right image signals and left image signals.

The signal processing and control unit 21A may set image areas according to not only the information on the image pickup plane and the lens information, but also processing such as diaphragm and zooming processing.

In the present embodiment, the signal processing and control unit 21A includes an image correcting unit 21b. The image correcting unit 21b receives the correction factor data from the lens information storing unit 43 in the interchangeable lens circuit section 40, and corrects right and left images generated by the signal processing and control unit 21A, using the correction factor data.

The main body circuit section 20A is also provided with a clock unit 27 and an operation determining unit 28. The clock unit 27 generates time information, which is used by the signal processing and control unit 21A. The operation determining unit 28 generates an operation signal based on a user's operation of a release switch or various types of switches for, e.g., shooting mode setting (not illustrated) provided to the image pickup apparatus 10 and outputs the signal to the signal processing and control unit 21A. The signal processing and control unit 21A controls the respective units based on operation signals.

Also, the main body circuit section 20A is provided with a recording and reproducing unit 26 and a main body display unit 30. The recording and reproducing unit 26 can record image information and sound information from the signal processing and control unit 21A to a recording medium (not illustrated). For the recording and reproducing unit 26, for example, a card interface may be employed, and the recording and reproducing unit 26 can record, e.g., image information and sound information into, e.g., a memory card. Also, the recording and reproducing unit 26 can read image information and sound information recorded in the recording medium and supplies the image information and sound information to the signal processing and control unit 21A. The signal processing and control unit 21A decodes the image information and sound information from the recording and reproducing unit 26 to obtain image signals and sound signals.

The main body display unit 30 can be supplied with a picked-up image from the image pickup unit 24 or a reproduced image from the recording and reproducing unit 26, from the signal processing and control unit 21A, and provide display of such image. Also, the main body display unit 30 can provide, e.g., a menu display for operating the image pickup apparatus 10, under control of the signal processing and control unit 21A. The main body display unit 30 may include a touch panel.

The signal processing and control unit 21A can control the interchangeable lens 12 and the electronic finder 13 via the communication units 22 and 23 as well as controlling the respective units in the main body circuit section 20A.

In the present embodiment, in recording a 3D image, the recording and reproducing unit 26 can combine a right image and a left image to form one image and record the combined image. Also, in recording a 3D image, the recording and reproducing unit 26 can record a right image and a left image as separate images.

In the present embodiment, also, for the interchangeable lens 12, the optical systems illustrated in FIGS. 5 to 7B can be employed.

Figure 20:
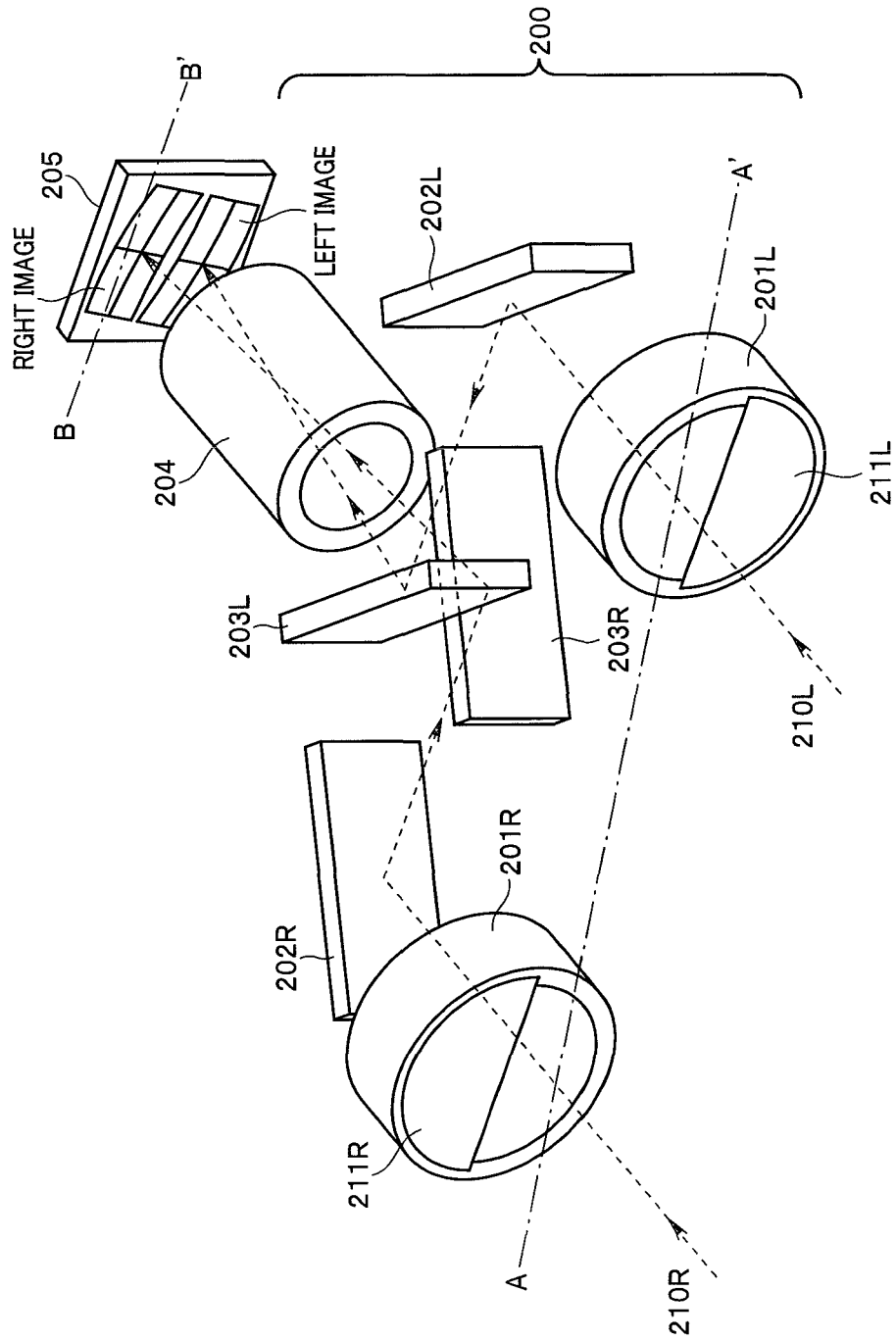
FIG. 20 is a diagram illustrating an example of another interchangeable lens.
Figure 21:
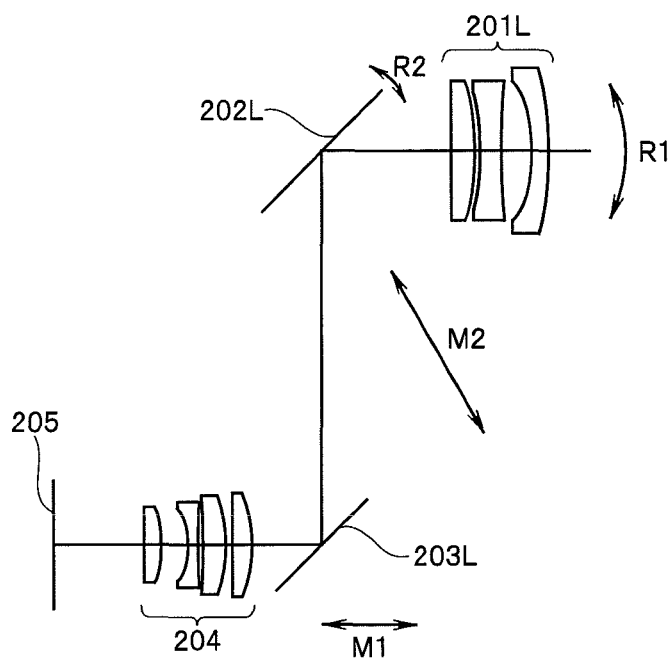
FIG. 21 is a diagram illustrating a top view of a configuration of an optical system in FIG. 20.
Figure 22:
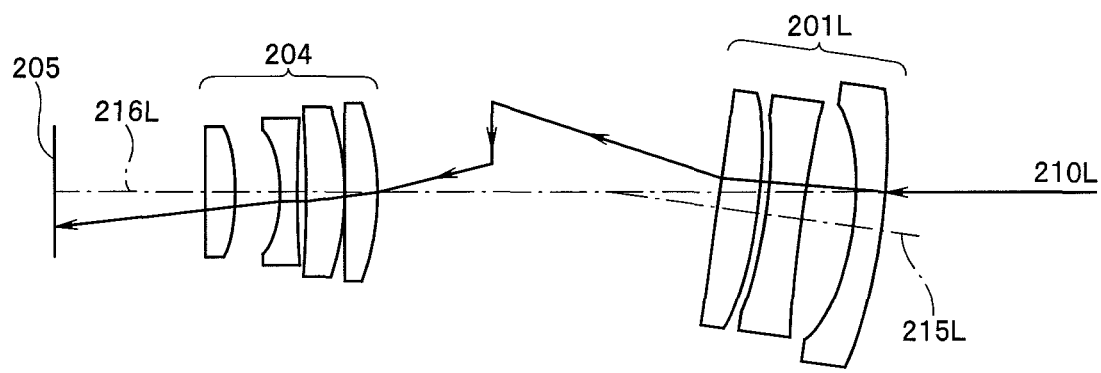
FIG. 22 is a diagram illustrating a side view of a configuration of an optical system in FIG. 20.

FIG. 20 is a diagram illustrating another example of an interchangeable lens that can be attached to a lens mount of the image pickup apparatus main body 11. FIG. 21 is a diagram illustrating a top view of a configuration of an optical system illustrated in FIG. 20, and FIG. 22 is a diagram illustrating a side view of the configuration of an optical system illustrated in FIG. 20.

Optical images formed on the image pickup device via the above-described interchangeable lens in FIGS. 5 to 7B have distortion, which is not described above with reference to FIGS. 5 to 7B. Considering active use of such distortion to effectively use the resolution of the image pickup device, it is favorable to arrange the optical systems so as to form optical images obliquely relative to a horizontal baseline. The interchangeable lens in FIG. 20 is configured from such point of view. The FIG. 20 example will be described supposing that an image pickup device 205 is arranged in the image pickup unit 24. Also, in the illustration in FIG. 20, symbols "L" and "R" following reference numerals are provided for distinguishing between components, etc., belonging to left and right optical paths.

An interchangeable lens 200 includes left and right objective lens groups 201L and 201R, first reflecting surfaces 202L and 202R and second reflecting surfaces 203L and 203R, which sequentially reflect incoming light from the objective lens groups 201L and 201R, a common image formation lens group 204, which the light reflected by the left second reflecting surface 203L and the light reflected by right second reflecting surface 203R enter, for left and right optical paths.

At positions where optical images are formed by the image formation lens group 204, an image pickup device 205, which is a single common image pickup device, is arranged.

On the light entrance side of the left and right objective lens groups 201L and 201R, field masks 211L and 211R, which transmit image formation light beams with principal light rays 210L and 210R as their centers, respectively, and block unwanted light, are arranged. For the field masks 211L and 211R, an example in which the field masks 211L and 211R are configured to have simple shapes covering the substantial lower side of the left objective lens group 201L and the substantial upper side of the tight objective lens group 201R, respectively, is illustrated.

As is clear from the Figure, for the reflection directions of the first reflecting surfaces 202L and 202R and the second reflecting surfaces 203L and 203R, the left first reflecting surface 202L bends an optical path of incoming light from the left objective lens group 201L by approximately 90 degrees to the right objective lens group 201R side, and the second reflecting surface 203L bends the bent optical path by approximately 90 degrees in the direction that is the same as and substantially in parallel to the optical path of the light entering the left objective lens group 201L to make the light enter the common image formation lens group 204, and similarly, the right first reflecting surface 202R bends the optical path of incoming light from the right objective lens group 201R by approximately 90 degrees to the left objective lens group 201L side, and the second reflecting surface 203R bends the bent optical path by approximately 90 degrees in the direction that is the same and substantially in parallel to the optical path of the light entering the right objective lens group 201R to make the light enter the common image formation lens group 204.

With the above-described configuration, the interchangeable lens 200 enables the image formation lens group 204 and the image pickup device 205, which are common to the left and right objective lens groups 201L and 201R, to be arranged there between. Furthermore, the horizontal width of the interchangeable lens 200 is substantially determined by the distance between the edges of the left and right objective lens groups 201L and 201R (the distance corresponding to the baseline length plus the aperture diameter of one of the objective lens groups), the thickness of the interchangeable lens 200 in the depth direction relative to a subject is substantially determined by the distance between the front surfaces of the objective lens groups 201L and 201R and the rear surfaces of the image formation lens group 204, and the height of the interchangeable lens 200 is substantially determined according to the sizes of the apertures of the objective lens groups 201L and 201R (since areas other than the effective areas of the objective lens groups 201L and 201R can be trimmed off, the height of the interchangeable lens 200 can be smaller than the apertures sizes), and a small-size configuration can be provided.

A left binocular parallax image formed on the image pickup device 205 by the image formation lens group 204 via the left objective lens group 201L, the first reflecting surface 202L and the second reflecting surface 203L in this order is projected on the lower half of the rectangular image pickup plane of the image pickup device 205 in an inverted manner, and a right binocular parallax image formed on the image pickup device 205 by the image formation lens group 204 via the right objective lens group 201R, the first reflecting surface 202R and the second reflecting surface 203R in this order is projected on the upper half of the rectangular image pickup plane of the image pickup device 205 in an inverted manner.

Here, the parallax direction of the entire optical system of the interchangeable lens 200 is the direction of a straight line A-A' connecting points in the incident lens surfaces of the left and right objective lens groups 201L and 201R or the field masks 211L and 211R on which the left and right principal light rays 210L and 210R are incident, and the parallax direction of the left and right images (parallax images) projected on the image pickup device 205 is the direction of a straight line B-B' parallel to sides of the rectangle image pickup device 205. As is clear from FIG. 20, in the interchangeable lens 200, the parallax direction A-A' of the entire optical system and the parallax direction B-B' of the optical images projected on the image pickup device 205 are in parallel to each other, and thus, the two left and right images are inclined relative to the parallax direction A-A' on the image pickup plane.

This is because each of the inclinations of the first reflecting surfaces 202L and 202R and the second reflecting surfaces 203L and 203R are not simply is an inclination with reference to an axis perpendicular to a same plane, but an inclination with reference to two axes, causing rotation of subject images projected on the image pickup device 205. Here, the left and right principal light rays 210L and 210R are defined as center light rays of light beams incident from the objective lens groups 201L and 201R and reaching the centers of the left and right images formed on the image pickup device 205 in the image formation lens group 204 via the first reflecting surfaces 202L and 202R and the second reflecting surfaces 203L and 203R, respectively, in this order.

While the left and right principal light rays 210L and 210R are defined as described above, the left and right objective lens groups 201L and 201R have respective optical axes (center axes and rotational axes) (see an optical axis 215L in FIG. 22), and the image formation lens group 204 has one optical axis (center axis and rotational axis) (see an optical axis in 216L in FIG. 22). Then, when the optical paths for the first reflecting surfaces 202L and 202R and the optical paths for the second reflecting surfaces 203L and 203R are developed to regard each of the left and right optical systems (lens systems) as one lens system, the optical axis 215L of the left objective lens group 201L and the optical axis 216L of the image formation lens group 204 correspond to each other, forming one optical axis. Also, the optical axis of the right objective lens group 201R and the optical axis of the image formation lens group 204 correspond to each other, forming one optical axis. Left and right light beams from a same subject enter the left and right objective lens groups 201L and 201R along the left and right principal light rays 210L and 210R, and forms left and right parallax images on the lower half and upper half of the rectangular image pickup plane of the image pickup device 205, respectively, in an inverted manner.

The principal light rays 210L and 210R entering the left and right objective lens groups 201L and 201R do not correspond to their respective optical axes: the left incoming principal light ray 210L forms an angle with the left optical axis on the upper side of the left optical axis, and the right incoming principal light ray 210R forms an angle with the right optical axis on the lower side of the right optical axis. However, in order to form the left and right images, the principal light rays 210L and 210R entering the left and right objective lens groups 201L and 201R are parallel to each other or form an angle on a substantially same plane according to the distance to the subject, and accordingly, the optical axes of the left and right objective lens groups 201L and 201R are twisted from each other with reference to the optical axis of the image formation lens group 204, and are in 180-degree rotational symmetry with each other.

The first reflecting surfaces 202L and 202R have a size and shape not limiting effective light beams that have passed though the objective lens groups 201L and 201R, and are arranged at an inclination angle of approximately 45 degrees in the horizontal direction, and at an inclination angle of several degrees in the vertical direction to the image pickup device 205 side, and make reflected light beams be incident on the second reflecting surfaces 203L and 203R, respectively. The second reflecting surfaces 203L and 203R are arranged substantially parallel to the first reflecting surfaces 202R and 202L in the horizontal direction and at a minute inclination angle to the image pickup device 205 side in the vertical direction, and make light beams enter the image formation lens group 204. Viewed in the vertical direction, the second reflecting surfaces 203L and 203R are arranged so that the left second reflecting surface 203L and the right second reflecting surface 203R are intersected with the left second reflecting surface 203L positioned above the right second reflecting surface 203R, and the second reflecting surfaces 203L and 203R deflect left and right incoming light beams so as to enter the image formation lens group 204 as vertically-arranged incoming light beams. Here, the second reflecting surfaces 203L and 203R form diaphragm members forming exit pupils.

Each of the light beams limited by the field masks 211L and 211R passes through a low-pass filter (not illustrated) in the image formation lens group 204 and forms a left image or a right image in one of upper and lower half areas of the image pickup device 205. By the effects of the field masks 211L and 211R, the upper and lower parallax images are formed on the image pickup device 205 in such a manner that the images do not overlap each other, but are separated in parallel to each other.

As described above, in the optical lens 200, main light beams do not pass through the centers of the lenses, but pass though the asymmetric optical systems, causing rotational asymmetric distortions. Also, the mirrors are arranged so that images are arranged one above the other while incoming light rays being horizontally arranged, and consequently, the images are rotated, causing inclinations of the left and right images. Furthermore, image darkening occurs, darkening the four corners of the images. Furthermore, depending on the size of the field masks, the defect of the left and right images overlapping each other may occur. In addition, a color reproducibility defect may occur due to chromatic aberration and color shading.

These defects are uniquely determined by the configurations of the lens systems. Therefore, in the interchangeable lens 200 in FIG. 20 and the respective interchangeable lenses in FIGS. 5 to 7B, correction factor data for correcting various types of reproducibility defects in images is stored in the lens information storing unit 24. Use of the correction factor data enables generation of images with the aforementioned reproducibility defects corrected.

As illustrated in FIG. 21, the lenses and reflecting surfaces of the interchangeable lens 200 can be moved or rotated. For example, the objective lens groups 201L and 201R are rotatable in a direction R1 in FIG. 21. Also, the first reflecting surfaces 202L and 202R are rotatable in a direction R2 in FIG. 21. Furthermore, the second reflecting surfaces 203L and 203R are movable in a direction M1 in FIG. 21, and the first reflecting surfaces 202L and 202R and the objective lens groups 201L and 201R are movable in a direction M2 in FIG. 21 so that the lengths of the optical paths between the respective first and second reflecting surfaces can be changed.

Also, change of the distance between the objective lens groups 201L and 201R (the distance between the first and second reflecting surfaces), that is, the baseline length enables change of the stereoscopic display effect. For example, a 3D image with an increased stereoscopic effect on the wide angle side can be provided by making the baseline length longer. In order to prevent change of other conditions such as angle of view and focusing, the baseline length is changed without changing the optical path lengths.

Figure 23A:
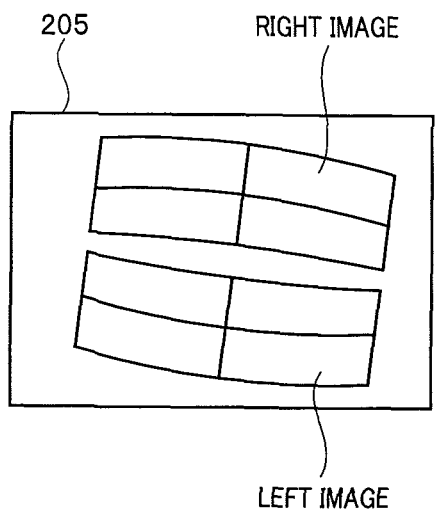
FIGS. 23A and 23B are diagrams each illustrating a relationship between a baseline length and a rotational angle of an image formed on an image pickup device.
Figure 23B:
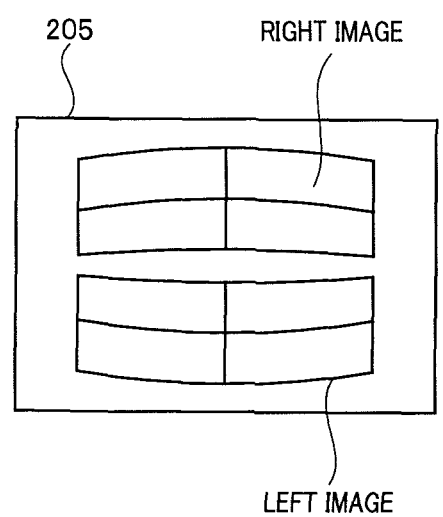

When the baseline length is changed, the rotation angle of the images is also changed. FIG. 23A and FIG. 23B are diagrams each illustrating the relationship between a baseline length and the rotational angle of images formed on the image pickup device. FIG. 23A illustrates left and right images in a case where the baseline length is relatively short, while FIG. 23B illustrates left and right images in a case where the baseline length is relatively long. As illustrated in FIGS. 23A and 23B, as the baseline length is longer, the rotation of the images is smaller.

As described above, in order to provide a high-quality 3D image, it is effective to change the baseline length and/or the vengeance angle according to, e.g., the distance to the subject to be shot in addition to the angle of view in shooting, and it is important to correct a plurality of images by means of the aforementioned changes according to the operation and/or conditions during shooting.

In the present embodiment, as described above, information on, e.g., the baseline length is also supplied to the signal processing and control unit 21A via the correction factor data included in the lens information, and the image correcting unit 21b can perform, e.g., correction of the rotational angle of the left and right images based on the correction factor data.

(Operation)

Figure 24:
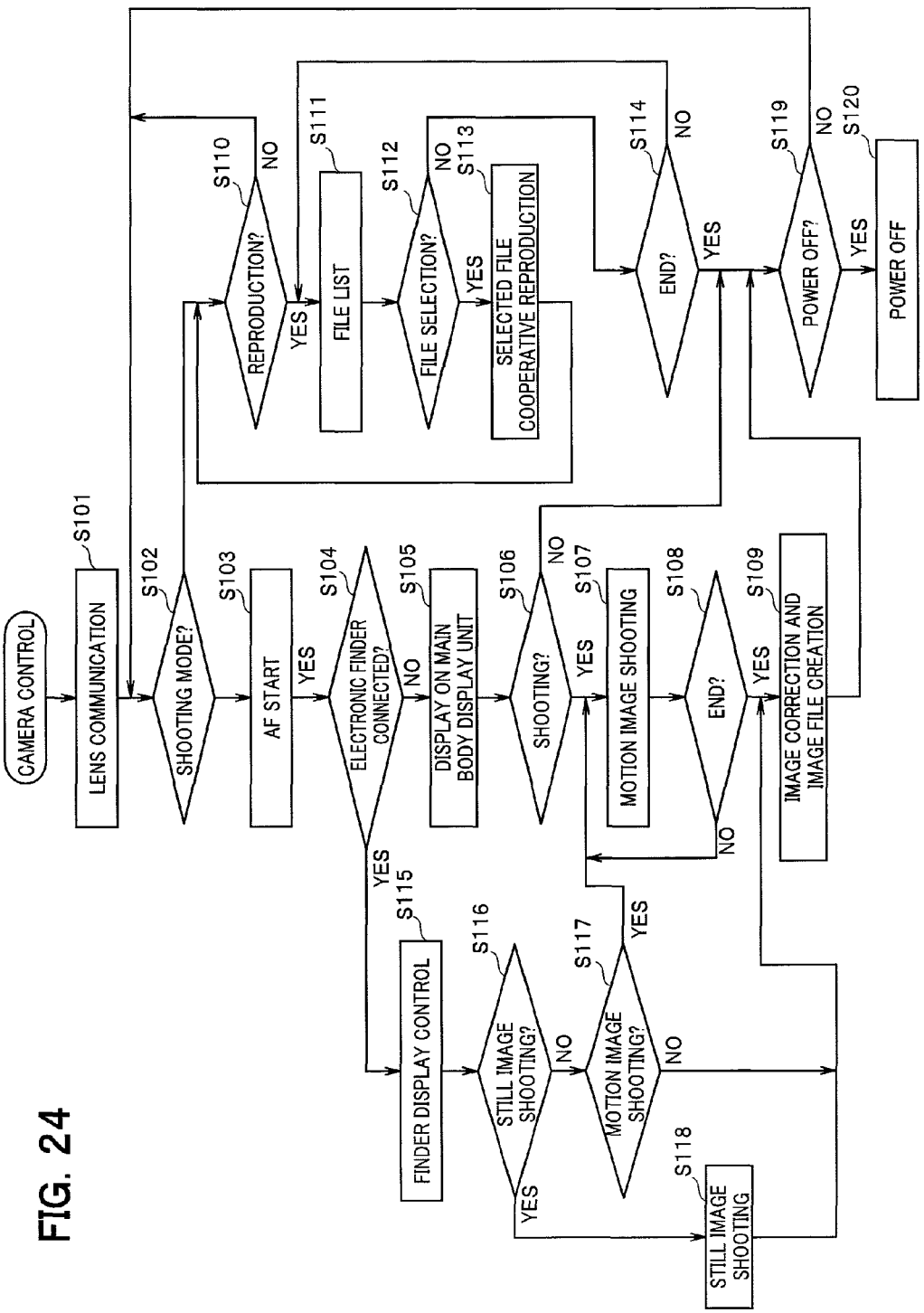
FIG. 24 is a flowchart illustrating camera control.
Figure 25:
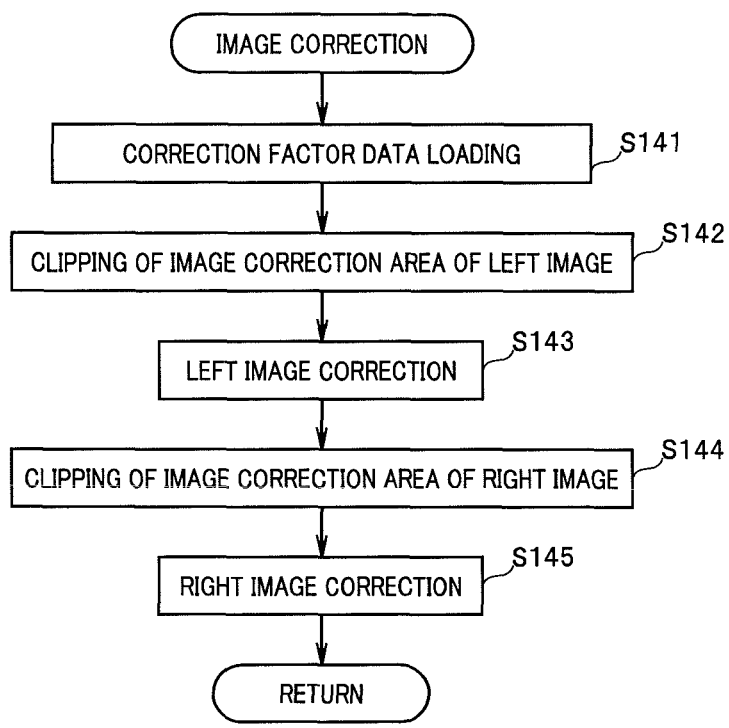
FIG. 25 is a flowchart illustrating image correction processing.
Figure 26:
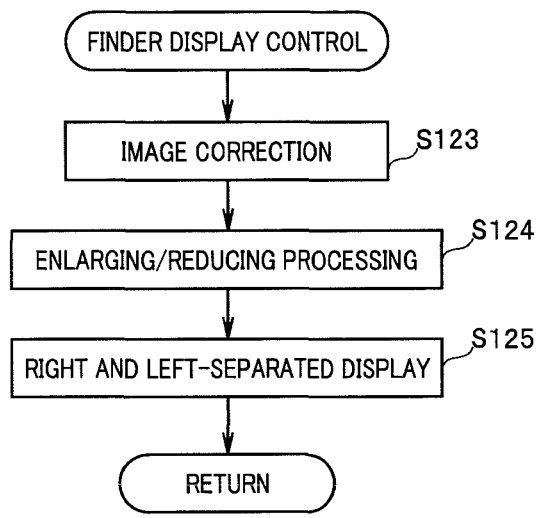
FIG. 26 is a flowchart illustrating a specific flow of finder control in step S14 in FIG. 24.

Next, an operation of the present embodiment configured as described above will be described with reference to FIGS. 24 and 25. FIG. 24 is a flowchart illustrating camera control, FIG. 25 is a flowchart illustrating image correction processing, and FIG. 26 is a flowchart illustrating a specific flow of finder display control in step S114 in FIG. 24.

In step S101 in FIG. 24, a lens communication is performed. The signal processing and control unit 21A controls the communication unit 22 to make the communication unit 22 communicate with the communication unit 42 in the lens control unit 41 in the interchangeable lens circuit section 40 to read lens information stored in the lens information storing unit 43. Consequently, correction factor data included in the lens information is read into the image correcting unit 21b in the signal processing and control unit 21A.

In the following step S102, the signal processing and control unit 21A determines whether or not the mode is shooting mode. Now, it is supposed that an instruction to select shooting mode is provided. In this case, in step S103, the signal processing and control unit 21A performs auto-focusing control (AF), and loads signals from the image pickup unit 24 to perform signal processing to generate image signals.

Furthermore, when an instruction to select shooting mode has been provided, in step S104, the signal processing and control unit 21A determines whether or not an electronic finder is connected.

Now, it is assumed that an electronic finder is not connected to an accessory shoe 61 of the image pickup apparatus main body 11. In this case, the signal processing and control unit 21A outputs the generated image signals to the main body display unit 30 to display a picked-up image (step 105).

Next, in step S106, the signal processing and control unit 21A determines whether or not an instruction to start shooting is provided. If an instruction to start shooting is not provided, in step S119, the signal processing and control unit 21A determines whether or not a power-off operation is performed, and if a power-off operation is not performed, returns the processing to step S102. If a power-off operation is performed, the power is turned off in step S120.

If it has been determined in step S106 that a user has given an instruction to start shooting, the signal processing and control unit 21A performs motion image shooting (step S107). In FIG. 24, although the description has been made in terms of the case where motion image shooting is performed by the instruction to start shooting in the mode of display on the main body display unit 30, still image shooting may be performed.

When an instruction to end shooting is given, the signal processing and control unit 21A advances the processing from step S108 to step S109 to perform image correction and image file creation. In other words, the signal processing and control unit 91A performs image correction simultaneously with the shooting.

In step S141 in FIG. 25, the image correcting unit 21b loads variable values in the correction factor data, which have varied accompanying change of the state of the interchangeable lens after the start of the camera control. In step S142, the image correcting unit 21b clips and reads image data in an area necessary for correcting, e.g., distortion in the image area for the left image based on the loaded correction factor data. Next, in step S143, the image correcting unit 21b corrects the left image based on the correction factor data.

Figure 27A:
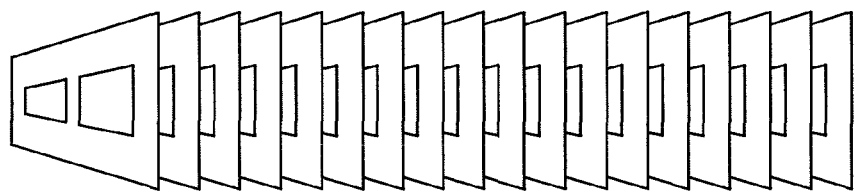
FIGS. 27A to 27C are diagrams illustrating an example of distortion correction.
Figure 27B:
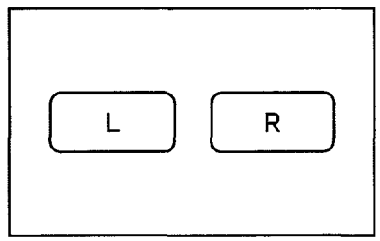
Figure 27C:
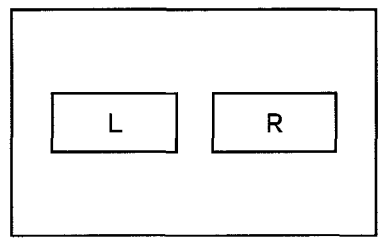

For example, the image correcting unit 21b corrects the left image by correcting rotational asymmetric distortion, optical distortion, image overlapping and/or a brightness error between a plurality of images for forming a 3D image, to provide a left image according to the subject. FIGS. 27A to 27C are diagrams illustrating an example of distortion correction. FIG. 27A illustrates left and right images in each frame, formed on the image pickup plane of the image pickup device, which are obtained by motion image shooting. The example in FIGS. 27A to 27C indicates that a left image (L) and a right image (R) are formed on the right and left sides of the image pickup plane of the image pickup device. FIG. 27B illustrates an example in which the four corners of the left and right images are distorted. In step S142, the image correcting unit 21b corrects the distortion, thereby obtaining the left image illustrated in FIG. 27C.

Also, the image correcting unit 21b corrects inclination of images. Furthermore, the image correcting unit 21b performs adjustment for alignment so that left and right images are correctly aligned in all the directions without distortion. Furthermore, the image correcting unit 21b also corrects image darkening in which the respective four corners of images are darkened. In a case where the left and right images overlap, the image correcting unit 21b performs processing for removing the overlapped area. Also, the image correcting unit 21b corrects images with color reproducibility defects using the correction factor data, thereby obtaining images with excellent color reproducibility.

In step S144, the image correcting unit 21b clips and reads image data in an area necessary for correcting, e.g., distortion in the image area for the right image based on the loaded correction factor data. Next, in step S145, the image correcting unit 21b corrects the right image based on the correction factor data. In correcting the right image, processing similar to the processing for correcting the left image is performed.

These errors between the plurality of images for a 3D image are caused not only by the shooting lens type and/or manufacturing errors, but also by the shooting conditions, and thus, such errors are corrected to provide a high-quality stereoscopic image.

The signal processing and control unit 21A performs recording processing on the images corrected by the image correcting unit 21b. In this case, the signal processing and control unit 21A combines the left and right images into one image and records the image, or records the left and right images as separate images.

Figure 28A:
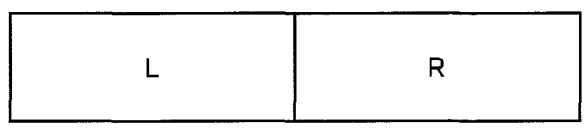
FIGS. 28A and 28B are diagram illustrating recording processing.
Figure 28B:
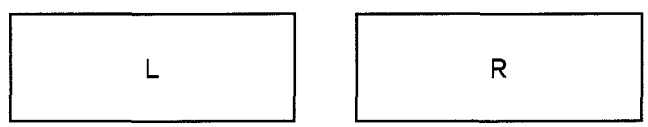

FIGS. 28A and 28B are diagrams illustrating the recording processing. FIG. 28A illustrates a state in which a left image L and a right image R are arranged in a horizontal side-by-side manner to combine the images into one image. The illustration in FIG. 28A corresponds to a recording method that is what is called "side-by-side method", and schematically indicates that signals are read from the left and right images for the respective columns and recorded. In this case, the signal processing and control unit 21A can separate the combined left and right images at the time of reproduction, using 3D frame size information.

Also, FIG. 28B illustrates that a left image L and a right image R are treated as separate images. If a combined image in the state in FIG. 28A is recorded, a display apparatus that displays a reproduced image of the combined image recognizes that left and right images are arranged on the left and right sides of the image and performs processing for stereoscopic display. Meanwhile, if images in the state in FIG. 28B are recorded, a display apparatus, which displays reproduced images of the images, loads the left and right images and performs processing for stereoscopic display.

FIG. 28B is a schematic diagram assuming a frame sequential method in which in the case of a motion image, left and right images are sequentially read for each frame for recording or reproduction. In this case, also, the signal processing and control unit 21A can separate the left and right images at the time of reproduction, using 3D frame size information.

For distinguishing the control between the frame sequential method and the side-by-side method, information to that effect is also provided.

In order to provide a stereoscopic image according to these methods, it is essential to eliminate the optical error factors and thereby obtain uniform images as in the present invention.

The signal processing and control unit 21A performs coding processing on the generated left and right images, and transfers the image information from the recording and reproducing unit 26 to a recording medium, and creates a file of the image information transferred to the recording and reproducing unit 26 in response to the instruction to end shooting.

Next, it is supposed that it has been determined in step S102 that an instruction to select reproduction mode is provided. In this case, the signal processing and control unit 21A advances the processing from step S110 to step S111, to read information on a list of files recorded in the recording and reproducing unit 26 and make the main body display unit 30 provide display of the file list.

During display of the file list, if a user selects a file (step S112), the signal processing and control unit 21A reads the selected file via the recording and reproducing unit 26 and performs decoding processing on the selected file to reproduce image signals and sound signals. The signal processing and control unit 21A provides the reproduced image signals and sound signals to the main body display unit 30 to make the main body display unit 30 display the signals (step S113).

During display of the file list, if an end operation is performed, the signal processing and control unit 21A advances the processing from step S112 to step S114 to end the reproduction mode.

Although the present embodiment has been described in terms of an example in which image correction is performed at the time of recording, image correction may be performed not at the time of recording but at the time of reproduction. In other words, in this case, the signal processing and control unit 21A provides a header area or auxiliary data recording area to files of left and right images picked up by the image pickup unit 24, and records correction factor data read from the interchangeable lens in the area in association with each image. Then, at the time of reproduction, using the correction factor data read in association with the left and right image data, image correction may be performed according to the image correction processing in FIG. 25.

In step S104 in FIG. 24, if the signal processing and control unit 21A has determined in step S104 that an electronic finder is connected, the signal processing and control unit 21A advances the processing to step S115 to perform image correction and finder display control.

In the finder display control, in step S123, the signal processing and control unit 21A performs image correction of the left and right images. The image correction in step S123 is processing similar to that in FIG. 25: the image correcting unit 21b corrects, e.g., distortion in the left and right images based on the correction factor data.

Next, in step S124, the signal processing and control unit 21A performs enlarging/reducing processing and frame image generation processing on the right image and the left image. The image sizes of the right image and the left image respond to the size of the image pickup plane of the image pickup device in the image pickup unit 24 and the light entrance range of the optical system. Thus, the image sizes of the right and left images may be different from the image sizes in the display units 55R and 55L of the electronic finder 13. Therefore, the signal processing and control unit 21A performs enlarging/reducing processing to adjust the image sizes of the right and left images to the image sizes in the display units 55R and 55L. Also, the signal processing and control unit 21A generates frame images according to the aspect ratios of the right and left images and the aspect ratios of the images to be displayed, and superimposes the frame images on the enlarged/reduced right and left images.

The signal processing and control unit 21A provides the generated right and left image signals to the finder control unit 51 in the electronic finder 13 via the communication units 23 and 52. The finder control unit 51 controls the display drive unit 54 to provide the right image signals to the display unit 55R and the left image signals to the display unit 55L based on parallax adjustment results such as described with reference to FIG. 17 (step S125), and returns the processing to the main routine. Consequently, the display device 55 in the electronic finder 13 provides 3D display based on the subject optical images picked up via the optical lens 12.

Here, it is supposed that a user gives an instruction to shoot a still image while viewing the 3D display. Then, the signal processing and control unit 21A advances the processing from step S116 to step S118 in FIG. 24 to perform still image shooting. In other words, the signal processing and control unit 21A performs image correction and processing to compress still images of the right and left images at the timing of the shooting instruction, and records the images in the recording medium via the recording and reproducing unit 26 (step S109). Furthermore, the signal processing and control unit 21A displays the still images of the right and left images after the image correction on the display units 55R and 55L for a fixed period of time.

Also, it is assumed that a user gives an instruction to shoot a motion image while viewing the 3D display. In this case, the signal processing and control unit 21A moves the processing from steps S116 and S117 to step S107 to perform motion image shooting.

As described above, in the present embodiment, communication with an interchangeable lens is performed to automatically obtain lens information including correction factor data, enabling automatic correction of image reproducibility defects such as distortion depending on the states of the lens systems of the interchangeable lens. The image correction is performed based not on lens control information held by the main body circuit section 20A, but on actual state information of the interchangeable lens, enabling highly accurate image correction.

In addition, correction factor data include state information on, e.g., zooming, focusing, rotational angle information and baseline length, which changes after start of camera control, enabling reliable image correction irrespective of the camera operation. Also, use of correction factor data such as rotational angle information and baseline length enables automatic correction of a rotational angle of images as well.

For zooming, focusing, rotational angle information and the baseline length, an interchangeable lens may hold correction factor data itself, or may also hold factor correction data for correcting initial correction factors according to changes in state of the interchangeable lens. In this case, the image correcting unit may correct the correction factor data based on the factor correction data and then perform image correction using the corrected correction factor data.

Figure 29:
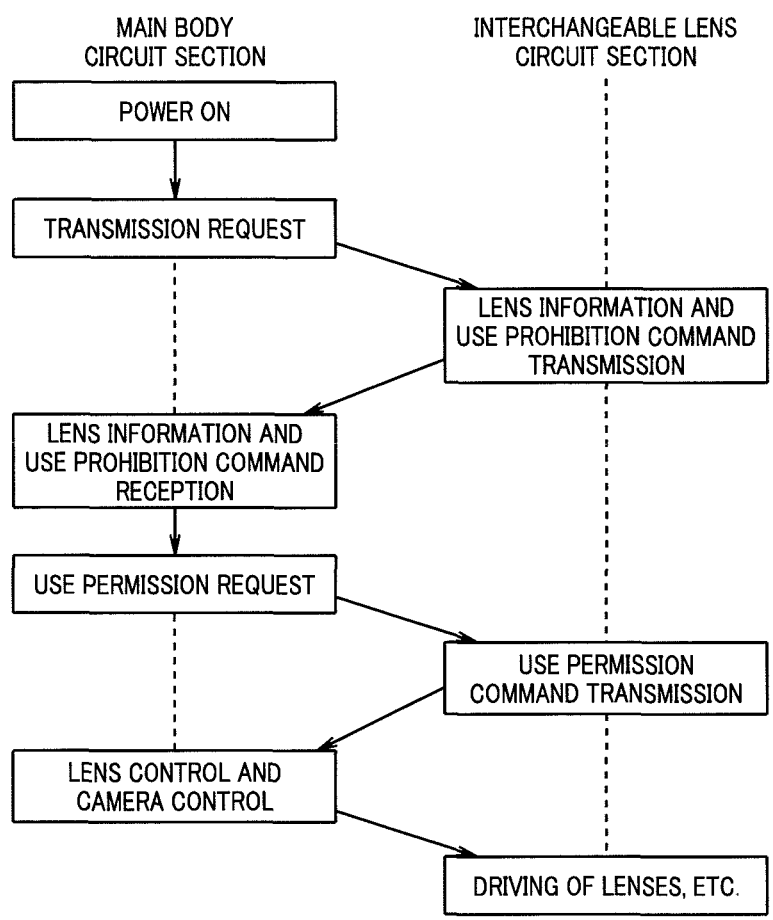
FIG. 29 is a diagram illustrating control according to an interchangeable lens.

For the interchangeable lens, a 2D lens may be employed. Therefore, as illustrated in FIG. 29, a flow in which only a 3D-capable body allows use of a 3D interchangeable lens may be employed.

When power is supplied to the main body circuit section 20A, the signal processing and control unit 21A requests the interchangeable lens circuit section 40 to transmit lens information. In response to the request, the interchangeable lens circuit section 40 transmits lens information to the main body circuit section 20A. Furthermore, the lens control unit 41 in the interchangeable lens circuit section 40 transmits a use prohibition command to the main body circuit section 20A.

When the main body circuit section 20A recognizes from the lens information that the lens is a 3D lens and the lens information includes image correction data, the main body circuit section 20A issues a command for use permission request in response to the use prohibition command and sends the command to the interchangeable lens circuit section 40.

The interchangeable lens circuit section 40 changes a use permission flag for the main body circuit section to a use permission state, and transmits a use permission command to the main body circuit section 20A. Consequently, the main body circuit section 20A performs the lens control of the interchangeable lens, and also performs image correction of picked up images from the image pickup unit 24 using correction factor data.

In a case where the main body circuit section is a non-3D-capable circuit, even if the main body circuit section receives a use permission command from the interchangeable lens circuit section 40, the main body circuit section performs neither lens control nor image correction.

Also, the following modes of a stereoscopic shooting interchangeable lens can be employed.

A stereoscopic image pickup optical system can be used for an interchangeable lens. If a stereoscopic image pickup optical system is used for an interchangeable lens, it is preferable to provide correction parameters relating to image correction (including numerical value data enabling correction parameter calculation), which is preferable because a memory increase in the camera main body and/or the number of updates of the firmware on the Web can be suppressed.

Although the embodiments have been described only in terms of a dual lens, it should be understood that the present invention can be applied to a lens for shooting images from three or more points of view or a system for providing a 3D image via one lens with divided areas.

(Appendix 1)

An image pickup apparatus including an image pickup unit, the image pickup apparatus allowing a stereoscopic shooting interchangeable lens to be connected thereto so that an image of a subject can be formed on the image pickup unit, the image pickup apparatus comprising a communication unit that obtains correction factor data enabling correction of a displacement of each of a plurality of images of the subject formed on the image pickup unit, the displacement being caused in a rotation direction relative to a principal light ray from the subject, from the interchangeable lens.

(Appendix 2)

An interchangeable lens apparatus that can be detachably attached to a camera main body including an image pickup device, the interchangeable lens apparatus comprising:

a stereoscopic image pickup optical system including a plurality of light ray incident surfaces, the stereoscopic image pickup optical system forming a plurality of parallax images on the image pickup device, the parallax images having parallax according to positions of the plurality of light ray incident surfaces;

a correction parameter storing unit that stores a correction parameter used for electrically correcting an image formed by the stereoscopic image pickup optical system; and a communication unit that when the communication unit is connected to the camera main body, can transmit the correction parameter stored in the storing unit to the camera main body.

(Appendix 3)

The stereoscopic shooting interchangeable lens apparatus according to appendix 2, wherein when the stereoscopic image pickup optical system is attached to the camera main body, a direction of a line connecting the respective principal light rays incident on the respective light ray incident surfaces is in parallel to a direction of arrangement of pixels in the image pickup device.

(Appendix 4)

The stereoscopic shooting interchangeable lens apparatus according to appendix 3, wherein the stereoscopic image pickup optical system includes:

a first light-guiding optical system including a first-first reflecting surface and a first-second reflecting surface for guiding a light ray from the subject to the image pickup device, the light ray being incident on one of the light ray incident surfaces; and a second light-guiding optical system including a second-first reflecting surface and a second-second reflecting surface for guiding a light ray from the subject to the image pickup device, the light ray being incident on another of the light ray incident surfaces.

(Appendix 5)

The stereoscopic shooting interchangeable lens apparatus according to appendix 4, wherein the stereoscopic image pickup optical system includes:

a first objective lens group and a second objective lens group, incident surfaces of which face the subject side, arranged in a parallax direction with a space therebetween, the first objective lens group and the second objective lens each having negative refractive power; and a group of image formation lenses arranged collectively or individually nearer to the images than the first and second objective lens groups, the group of image formation lenses having positive refractive power.

(Appendix 6)

The stereoscopic shooting interchangeable lens apparatus according to any one of appendices 2 to 5, wherein the stereoscopic image pickup optical system is configured so that at least two parallax images from among the parallax images having parallax projected on the image pickup device are mutually aligned in a direction that is different from a parallax direction of the parallax images.

(Appendix 7)

The stereoscopic shooting interchangeable lens apparatus according to any one of appendices 2 to 6, wherein when a center light ray of a light beam reaching a center of a parallax image projected on the single image pickup device via the first objective lens group, the first light-guiding optical system and the image formation lens group is a first principal light ray and when a center light ray of a light beam reaching a center of a parallax image projected on the single image pickup device via the second objective lens group, the second light-guiding optical system and the image formation lens group is a second principal light ray, the first objective lens group and the second objective lens group are optical systems that deflect the corresponding first principal light ray and the corresponding second principal light ray, respectively.

(Appendix 8)

The stereoscopic shooting interchangeable lens apparatus according to appendix 7, wherein the first principal light ray entering the first objective lens group and the second principal light ray entering the second objective lens group are positioned on a substantially same plane.

(Appendix 9)

The stereoscopic shooting interchangeable lens apparatus according to appendix 6, wherein the direction that is different from the parallax direction, in which the parallax images are mutually aligned on the image pickup device, is a direction intersecting the parallax direction of the parallax images.

(Appendix 10)

The stereoscopic shooting interchangeable lens apparatus according to appendix 5, wherein an image pickup plane of the image pickup device has a rectangular shape having a long side direction and a short side direction, and a parallax image formed via the first objective lens group and a parallax image formed via the second objective lens group are projected in such a manner that the parallax images are aligned in the short side direction of the single image pickup device.

(Appendix 11)

The stereoscopic shooting interchangeable lens apparatus according to appendix 2, wherein the correction parameter storing unit stores a correction parameter used for correction of rotation of the plurality of parallax images formed by the stereoscopic image pickup optical system.

(Appendix 12)

The stereoscopic shooting interchangeable lens apparatus according to appendix 2, wherein the correction parameter storing unit stores a correction parameter used for correction of distortion in the plurality of parallax images formed by the stereoscopic image pickup optical system.

(Appendix 13)

The stereoscopic shooting interchangeable lens apparatus according to appendix 2, wherein the correction parameter storing unit stores a correction parameter used for correction of shading in the plurality of parallax images formed by the stereoscopic image pickup optical system.

(Appendix 14)

The stereoscopic shooting interchangeable lens apparatus according to appendix 2, wherein the correction parameter storing unit stores a correction parameter used for correction of chromatic aberration in the plurality of parallax images formed by the stereoscopic image pickup optical system.

(Appendix 15)

The stereoscopic shooting interchangeable lens apparatus according to appendix 2, wherein the correction parameter storing unit stores a parameter for performing image clipping for avoiding generation of an area in which the plurality of parallax images formed by the stereoscopic image pickup optical system overlap.

(Appendix 16)

The stereoscopic shooting interchangeable lens apparatus according to appendix 2, wherein the correction parameter storing unit stores information indicating a space between the principal light rays on the incident surfaces of the stereoscopic image pickup optical system.

(Appendix 17)

The stereoscopic shooting interchangeable lens apparatus according to appendix 2, wherein the correction parameter storing unit stores information indicating an angle formed by the principal light rays in the stereoscopic image pickup optical system.

(Appendix 18)

The stereoscopic shooting interchangeable lens apparatus according to appendix 2, wherein the correction parameter storing unit stores information indicating a zooming state, a focusing state and a diaphragm value of the stereoscopic image pickup optical system.

(Appendix 19)

The stereoscopic shooting interchangeable lens apparatus according to appendix 2, wherein the stereoscopic image pickup optical system allows an angle formed by the principal light rays and/or a distance between principal light ray passage positions on the light ray incident surfaces to be changed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup unit;
   a first connection unit that allows a stereoscopic shooting interchangeable lens and an ordinary shooting interchangeable lens to be selectively attached to the first connection unit so that an image of a subject can be formed on the image pickup unit;
   a second connection unit that allows a finder including two display units corresponding to a right eye and a left eye, the finder being capable of displaying a plurality of images, and a finder including a single display unit, the finder being capable of displaying a single image, to be selectively attached to the second connection unit; and
   a display control unit that controls display of an image picked up by the image pickup unit on the finder, based on at least one of information on the interchangeable lens connected to the first connection unit and information on the finder connected to the second connection unit.

2. The image pickup apparatus according to claim 1, further comprising
   a display unit arranged on a back surface of a main body of the apparatus, and a touch panel on the display unit,
   wherein the display control unit controls display of the picked-up image based on a result of operation of the touch panel.

3. The image pickup apparatus according to claim 1, further comprising
   a vertical/horizontal direction detecting unit that detects whether the main body of the image pickup apparatus in which the image pickup unit is arranged is vertically or horizontally held, and outputs vertical/horizontal direction detection information,
   wherein the display control unit controls the display of the picked-up image, based on at least one of the information on the interchangeable lens, the information on the finder and the vertical/horizontal direction detection information.

4. The image pickup apparatus according to claim 1,
   wherein the display control unit obtains the information on the interchangeable lens as a result of the interchangeable lens being connected to the first connection unit, and obtains the information on the finder as a result of the finder being connected to the second connection unit.

5. The image pickup apparatus according to claim 1,
   wherein when a stereoscopic image has been picked up by the image pickup unit, the display control unit sets a right-eye image area and a left-eye image area in which a right-eye image and a left-eye image included in the stereoscopic image are formed, respectively, on an image pickup plane of the image pickup unit based on information on the image pickup plane of the image pickup unit and the information on the interchangeable lens, and provides a right-eye image and a left-eye image read from the right-eye image area and the left-eye image area to two display units corresponding to the right eye and the left eye, respectively, to make the display units display the right-eye image and the left-eye image.

6. The image pickup apparatus according to claim 3,
   wherein the display control unit rotates the picked-up image based on the information on the interchangeable lens, the vertical/horizontal direction detection information and information on a direction of a line connecting the two display units, and provides the picked-up image to the finder to make the finder display the picked-up image.

7. The image pickup apparatus according to claim 1,
   wherein the display control unit performs enlarging/reducing processing on the picked-up image based on the information on the interchangeable lens, the information on an image pickup plane of the image pickup unit and the information on the finder, and provides the picked-up image to the finder to make the finder display the picked-up image.

8. The image pickup apparatus according to claim 1,
   wherein the stereoscopic shooting interchangeable lens is rotatably attached to a main body of the image pickup apparatus in which the image pickup unit is arranged, the stereoscopic shooting interchangeable lens enabling stereoscopic shooting irrespective of the direction of the main body of the image pickup apparatus.

9. The image pickup apparatus according to claim 3, wherein when a stereoscopic image has been picked up by the image pickup unit, the display control unit sets a right-eye image area and a left-eye image area in which a right-eye image and a left-eye image included in the stereoscopic image are formed, respectively, on an image pickup plane of the image pickup unit based on information on the image pickup plane of the image pickup unit, the information on the interchangeable lens and vertical/horizontal direction detection information.

10. The image pickup apparatus according to claim 1, further comprising:
a main body display unit provided in a main body of the image pickup apparatus, in which the image pickup unit is arranged,
wherein when a stereoscopic image has been picked up by the image pickup unit, the display control unit makes the main body display unit display a right-eye image and a left-eye image included in the stereoscopic image by time sharing.

* * * * *